(12) United States Patent
Krolski et al.

(10) Patent No.: US 12,162,703 B2
(45) Date of Patent: Dec. 10, 2024

(54) COMBINATION RAMP AND LOAD LEVELERS

(71) Applicant: Motis Brands, Inc., Germantown, WI (US)

(72) Inventors: Robert Krolski, Kewaskum, WI (US); Carl Richter, Menomonee Falls, WI (US); Clint Berry, Rapid River, MI (US)

(73) Assignee: Motis, LLC, Germantown, WI (US)

( * ) Notice: Subject to any disclaimer, the term of this patent is extended or adjusted under 35 U.S.C. 154(b) by 634 days.

(21) Appl. No.: 17/376,744

(22) Filed: Jul. 15, 2021

(65) Prior Publication Data

US 2022/0017314 A1    Jan. 20, 2022

Related U.S. Application Data

(60) Provisional application No. 63/052,677, filed on Jul. 16, 2020.

(51) Int. Cl.
*B65G 67/20* (2006.01)
*B23K 26/26* (2014.01)

(52) U.S. Cl.
CPC .............. *B65G 67/20* (2013.01); *B23K 26/26* (2013.01)

(58) Field of Classification Search
CPC .......... B65G 67/20; B23K 26/26; A61G 3/06; A61G 3/061; A61G 3/062; A61G 3/068
See application file for complete search history.

(56) References Cited

U.S. PATENT DOCUMENTS

| | | | |
|---|---|---|---|
| 2,141,529 A * | 12/1938 | Gravelle | B60B 39/12 14/2.4 |
| 3,184,773 A * | 5/1965 | Breneman | B65G 69/30 14/69.5 |
| 3,517,791 A | 6/1970 | Miles | |
| 3,691,576 A | 9/1972 | Miles | |
| 3,984,891 A | 10/1976 | Weinmann | |
| 3,984,961 A | 10/1976 | Chieger | |
| 4,723,758 A | 2/1988 | Gehrig | |
| 4,912,796 A | 4/1990 | Crump | |
| 5,033,147 A | 7/1991 | Svensson | |
| 5,277,436 A | 1/1994 | Frank | |
| 5,651,154 A | 7/1997 | Ahlskog | |
| 5,781,953 A * | 7/1998 | Winter | B65G 69/287 52/693 |
| 5,903,943 A | 5/1999 | Sherrod | |
| 5,938,397 A * | 8/1999 | Schouest | B65G 69/30 414/537 |
| 6,009,587 A * | 1/2000 | Beeman | B65G 69/30 414/537 |
| 6,267,082 B1 | 7/2001 | Naragon | |

(Continued)

*Primary Examiner* — Abigail A Risic
(74) *Attorney, Agent, or Firm* — Andrus Intellectual Property Law, LLP

(57) ABSTRACT

A ramp apparatus may include an extruded beam extending between a first ramp end and a second ramp end. The extruded beam may include a top wall, a bottom wall opposite the top wall, and a first side wall and a second side wall that each extend between the top and bottom walls. A first brace wall can extend at an angle away from the first side wall at a first interior corner of the extruded beam. A second brace wall may extend at an angle away from the second side wall at a second interior corner of the extruded beam.

19 Claims, 15 Drawing Sheets

(56) References Cited

U.S. PATENT DOCUMENTS

| | | |
|---|---|---|
| 6,345,950 B1 | 2/2002 | Gerwitz |
| 6,389,629 B1 | 5/2002 | Schouest |
| 6,430,769 B1 | 8/2002 | Allen |
| 6,533,251 B1 | 3/2003 | Abbaticchio |
| 6,739,106 B2 | 5/2004 | Curatolo |
| 6,874,766 B2 | 4/2005 | Curatolo |
| 7,104,524 B1 | 9/2006 | Hidding |
| 7,178,303 B2 | 2/2007 | Aota |
| 7,179,042 B1 * | 2/2007 | Hartmann ............... B65G 69/30 |
| | | 414/537 |
| 7,225,492 B2 | 6/2007 | Pratt |
| 7,299,517 B1 * | 11/2007 | Adinolfe ................ B65G 69/30 |
| | | 193/38 |
| 7,302,725 B2 | 12/2007 | Thygesen |
| 7,520,104 B2 | 4/2009 | Aota |
| D602,673 S * | 10/2009 | Allen ............................ D34/32 |
| 7,607,186 B1 | 10/2009 | Mitchell |
| 7,694,375 B2 | 4/2010 | Twedt |
| 7,930,788 B1 | 4/2011 | Beilstein |
| 7,950,094 B2 | 5/2011 | Bailie |
| 8,061,943 B1 | 11/2011 | Beilstein |
| 8,347,439 B1 | 1/2013 | Beilstein |
| 8,448,278 B1 | 5/2013 | Beilstein |
| 8,534,952 B2 | 9/2013 | Vladislavic |
| 8,813,289 B1 | 8/2014 | Clark |
| 9,863,103 B2 | 1/2018 | Osberg |
| 10,000,146 B2 * | 6/2018 | Vipond ............. B62D 33/0273 |
| 10,029,742 B2 | 7/2018 | Evans |
| 10,710,824 B2 | 7/2020 | Krolski et al. |
| 2002/0098071 A1 | 7/2002 | Henderson |
| 2003/0182740 A1 | 10/2003 | Schmaltz |
| 2004/0083562 A1 * | 5/2004 | Leblanc ................ B65G 69/30 |
| | | 14/69.5 |
| 2004/0111814 A1 | 6/2004 | Allen |
| 2005/0051762 A1 | 3/2005 | Giralt |
| 2007/0234491 A1 * | 10/2007 | Bailie ..................... E04G 27/00 |
| | | 14/69.5 |
| 2008/0142772 A1 * | 6/2008 | Amendola .......... E04H 17/1417 |
| | | 256/64 |
| 2008/0179580 A1 | 7/2008 | McGinness |
| 2008/0201874 A1 | 8/2008 | Coyle |
| 2009/0016865 A1 * | 1/2009 | Astor .................. B65G 69/287 |
| | | 14/71.7 |
| 2014/0119814 A1 | 5/2014 | Osikowicz |
| 2015/0013081 A1 | 1/2015 | Breeden, III |
| 2015/0074924 A1 * | 3/2015 | Bernart ................ B65G 69/30 |
| | | 14/69.5 |
| 2017/0275886 A1 * | 9/2017 | Ueno .................... B61D 23/02 |
| 2023/0220676 A1 * | 7/2023 | Matsushita ............ B61D 23/00 |
| | | 14/69.5 |
| 2023/0235565 A1 * | 7/2023 | Matsushita ........... E04F 11/002 |
| | | 14/69.5 |

* cited by examiner

COMBINATION RAMP AND LOAD LEVELERS

CROSS REFERENCE TO RELATED APPLICATIONS

The present application claims priority of U.S. Provisional Patent Application No. 63/052,677, filed on Jul. 16, 2020. The contents of which is incorporated by reference herein in entirety.

FIELD

The present disclosure relates to cargo loading and transportation, and in particular, to combination ramp and load levelers for semi-trailers.

BACKGROUND

Ramps allow vehicles and cargo to be loaded onto open or enclosed trailers. Load levelers support loads above open drop deck semi-trailers. Ramps that can be utilized as load levelers may be referred to as combination ramp and load levelers. U.S. Pat. Nos. 7,930,788 and 8,347,439 disclose examples of combination ramp and load levelers. U.S. Pat. No. 8,448,278 discloses examples of a ramp. U.S. Pat. No. 8,061,943 discloses examples of a load leveler. Each of U.S. Pat. Nos. 7,930,788; 8,061,943; 8,347,439; and 8,448,278 are incorporated herein by reference in their entireties.

Combination ramp and load levelers are commonly constructed with multiple components that are welded together. This results in a heavier device and is more complicated to construct. Failure of the welds can result in damage to the load, the semi-trailer, and/or other vehicles. Accordingly, there is a need in the art for improved combination ramp and load levelers.

This Background is intended to introduce various aspects of the art, which may be associated with the present disclosure to thereby assist in providing a framework to facilitate a better understanding of particular aspects of the present disclosure. Accordingly, it should be understood that this Background should be read in this light, and not necessarily as admissions of prior art.

SUMMARY OF THE INVENTION

Various other features, objects, and advantages will be made apparent from the following description taken together with the drawings.

An example of a ramp apparatus includes an extruded beam extending between a first ramp end and a second ramp end The extruded beam includes a top wall. A bottom wall is opposite the top wall. A first side wall and a second side wall each extend between the top wall and the bottom wall. A first brace wall extends from the first side wall at a first interior corner of the extruded beam. The first brace wall angles away from the first interior corner. A second brace wall extends from the second side wall at a second interior corner of the extruded beam. The second brace wall angles away from the second interior corner.

In further examples of the ramp apparatus, a third brace wall extends from the top wall to the bottom wall. The first brace wall, the second brace wall, and the third brace wall connect at a midpoint of either the top wall or the bottom wall. The first interior corner is a corner between the first side wall and the bottom wall. The he second interior corner is a corner between the second side wall and the bottom wall. The first and second brace walls meet at the midpoint of the top wall. A curb wall that projects upward from the top wall proximate a lateral side of the extruded beam, the curb wall extending between the first ramp end and the second ramp end. A first end piece is secured about the first ramp end and is connected to the first side wall, the second side wall, and at least one of the top wall or the bottom wall. A second end piece is secured about the second ramp end and is connected to the first side wall, the second side wall, and at least one of the top wall or the bottom wall. At least one of the first end piece and the second end piece is an end hook.

In other examples of the ramp apparatus, the apparatus includes a first beam and a second beam. The first beam and the second beam both include a top wall, a bottom wall opposite the top wall and side walls that each extend between top wall and the bottom wall. Brace walls extend from interior corners between a side wall and the bottom wall. Brace walls extend from interior corners between another side wall and the bottom wall. The first beam and the second beam are arranged in a lengthwise manner with a side wall of the first beam secured to a side wall of the second beam. The ramp apparatus has a length dimension between the first ramp end and the second ramp end and a width dimension perpendicular to the length dimension. The first beam and the second beam provide the extent of the ramp apparatus in the width dimension. The side wall of the first beam and the side wall of the second beam are secured by a tongue and groove joint. The side wall of the first beam includes a tongue projecting outward from the side wall. The side wall of the second beam includes a recess that extends into the side wall of the second beam. The tongue is configured to engage into the recess. A first chamfered corner is between the first top wall and the second side wall. A second chamfered corner is between the second top wall and the third side wall. A first groove is formed by the first chamfered corner and the second chamfered corner. A third chamfered corner is between the first bottom wall and the second side wall. A fourth chamfered corner is between the second bottom wall and the third side wall. A second groove is formed by the third chamfered corner and the fourth chamfered corner.

In still further examples of the ramp apparatus, a plate is secured across the top wall of the first beam and the top wall of the second beam. The plate may extend from the first ramp end to the second ramp end and may include a plurality of traction openings formed through the plate. The plate may include a plurality of weld receiving openings in a row aligned with a seam between the second side wall and the third side wall. A handle is rotatably secured to the top wall of the first beam or to the top wall of the second beam by a clamping portion of the plate. The plate may include a first handle opening configured to receive a gripping portion of the handle to a first side of the clamping portion and a second handle opening configured to receive the gripping portion of the handle to a second side of the clamping portion. A first set of fingers may project outward from the second side wall. A second set of fingers may project outward from the third side wall.

An example of a method for fabricating a combination ramp and load leveler apparatus includes aligning a first beam with a second beam in a lengthwise configuration such that the first beam and the second beam each extend between a first ramp end and a second ramp end. A plate is placed on a first top wall of the first beam and a second top wall of the second beam such that a column of weld openings formed in the plate is aligned with a seam between the first beam and the second beam. A first bottom wall of the first beam is welded to a second bottom wall of the second beam along a lower groove that extends from the first ramp end to the second ramp end at the seam between the first beam and the second beam. A first top wall is welded to a second top wall at the seam between the first beam and the second beam through weld openings in the plate.

BRIEF DESCRIPTION OF THE DRAWINGS

The present disclosure is described with reference to the following Figures. The same numbers are used throughout the Figures to reference like features and like components.

DETAILED DISCLOSURE

Figure 1:
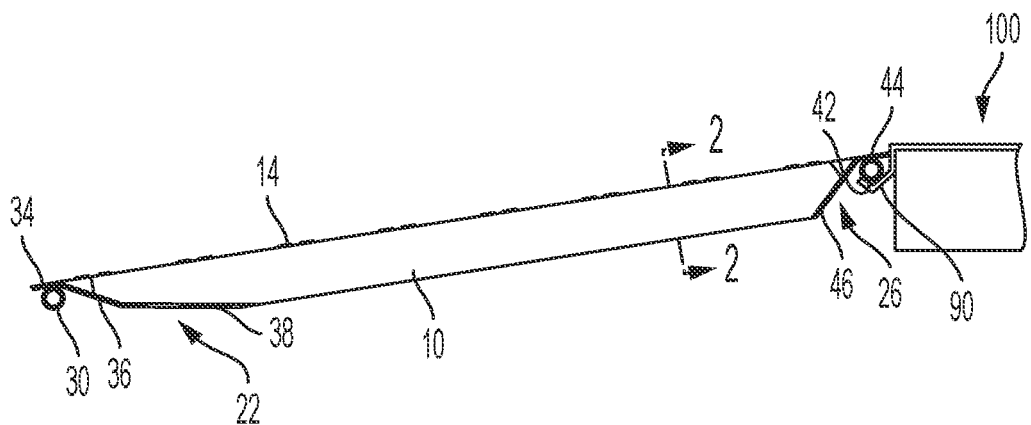
FIG. 1 is side view of a combination ramp and load leveler.
Figure 2:
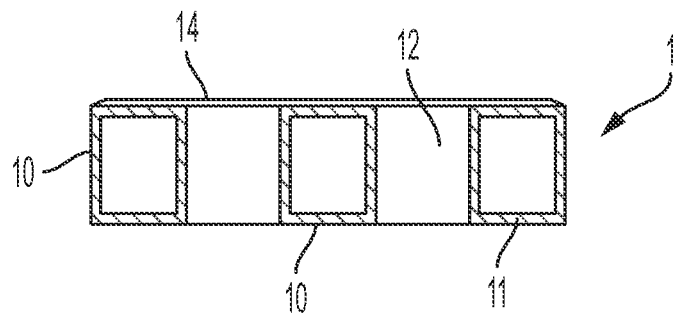
FIG. 2 is a cross-sectional view of a combination ramp and load leveler of FIG. 1 along line 2-2 on FIG. 1.
Figure 3:
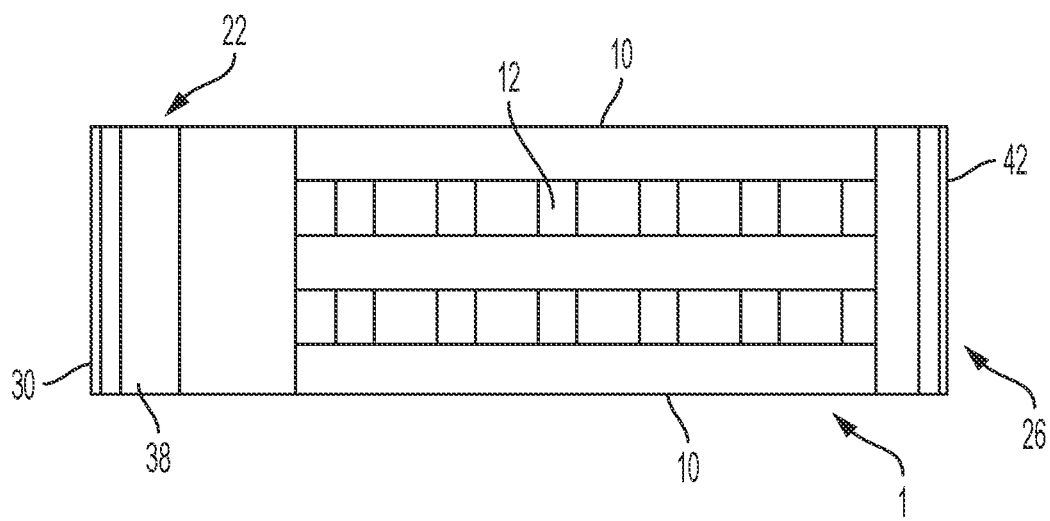
FIG. 3 is a bottom view of the combination ramp and load leveler of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left" or "right" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements or machines from another.

Referring now to the figures, FIGS. 1-4 depict a combination ramp and load leveler 1 as disclosed in U.S. Pat. No. 8,347,439, the contents of which is hereby incorporated by reference in its entirety. The combination ramp and load leveler 1 includes three longitudinal support members 10, a plurality of lateral cross members 12, and a plurality of cross treads 14. The support members 10 and the cross members 12 are preferably fabricated from square aluminum tubing that are welded together to form the combination ramp and load leveler 1. As depicted, the plurality of lateral cross members 12 are welded into position between adjacent longitudinal support members 10. When the support members 10 and the cross members 12 are welded, gaps or openings are defined therebetween. The cross treads 14 are welded to the top surface of the support members 10. Opposing attachment ends 22, 26 are coupled at the ends of the combination ramp and load leveler 1 such that the support members 10 and the cross members 12 are between the attachment ends 22, 26. The attachment ends 22, 26 comprise cover plates 28, 40, legs 36, 38, 46, retention tubes 30, 42, and tube flanges 34, 44.

Figure 4:
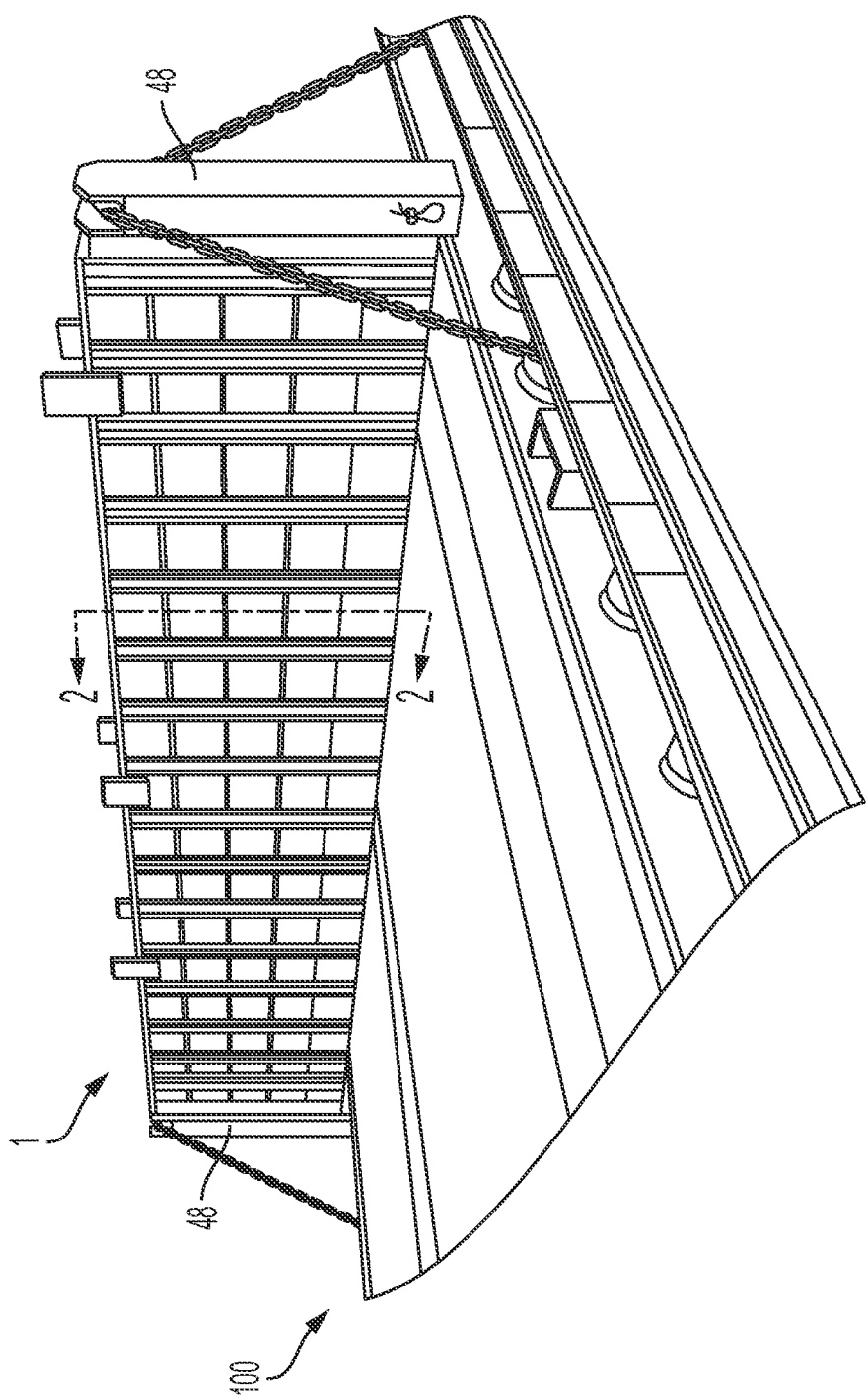
FIG. 4 is a perspective view of the combination ramp and load leveler of FIG. 1 in a load leveler configuration.

FIG. 1 depicts the combination ramp and load leveler 1 on an open drop deck semi-trailer 100 in a ramp configuration. In the ramp configuration, the retention tube 42 is pivotally retained in a receiver 90 of the semi-trailer 100. FIG. 4 depicts the combination ramp and load leveler 1 on the semi-trailer 100 in a load leveler configuration. In the load leveler configuration, the retention tubes 30, 42 are retained in stake receivers 48 which are anchored in and extend from the deck of the semi-trailer 100.

Figure 5:
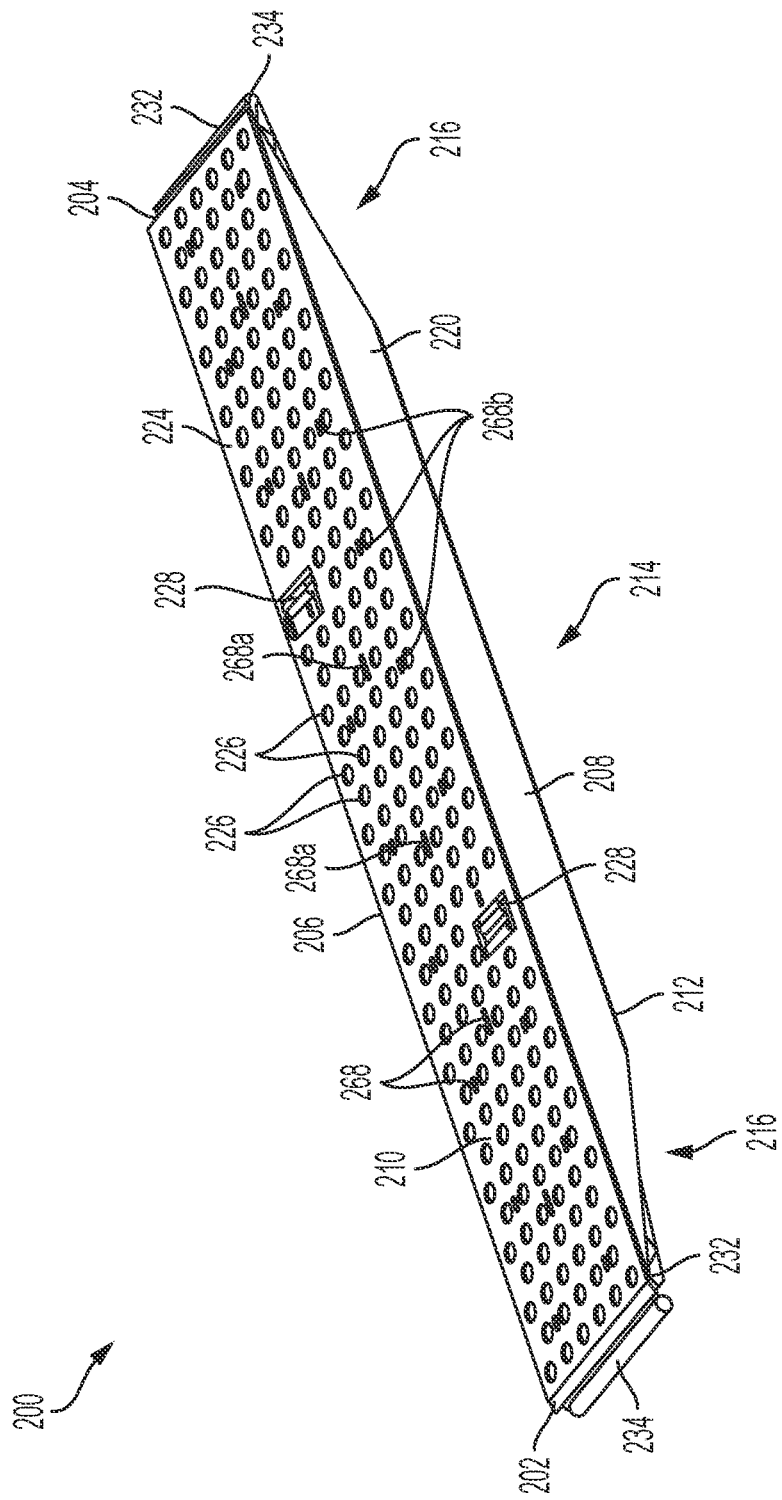
FIG. 5 is a perspective view of an exemplary embodiment of ramp apparatus configured as a combination ramp and load leveler.
Figure 6:
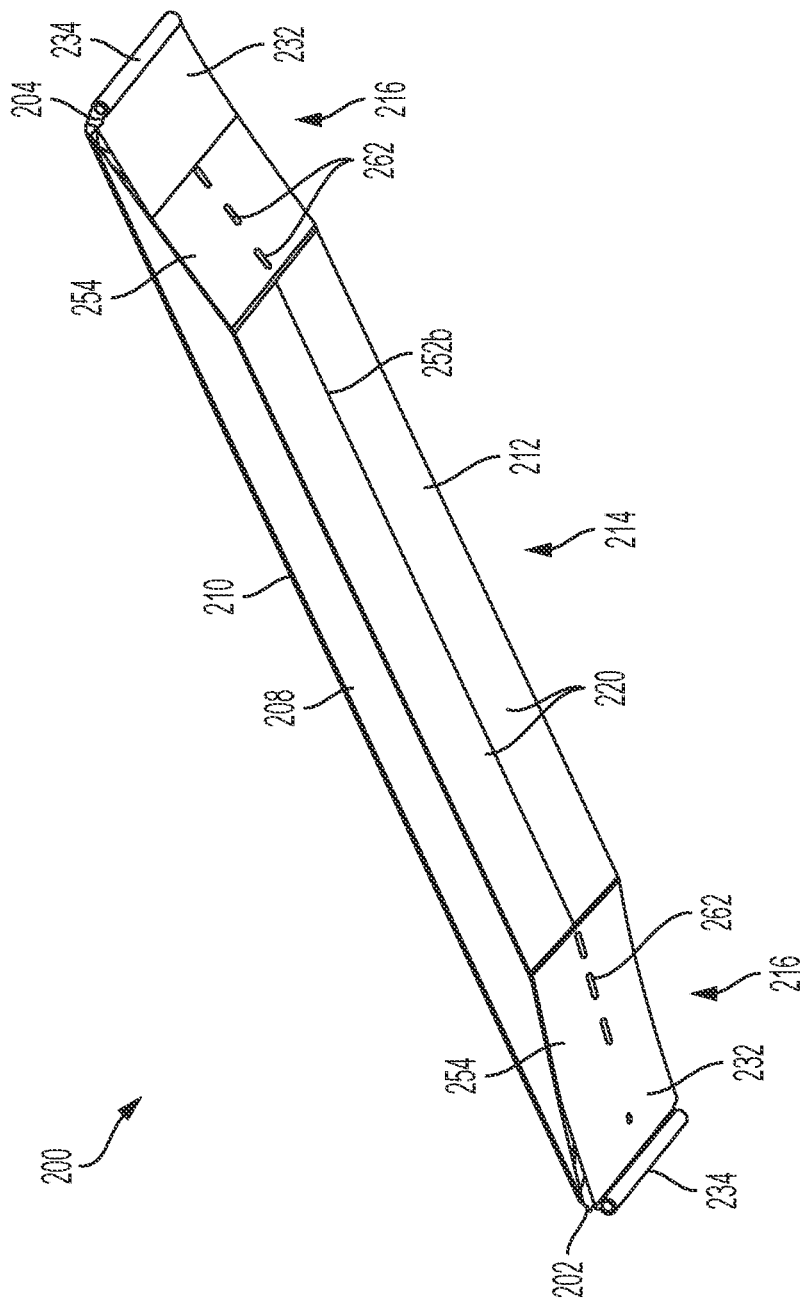
FIG. 6 is another perspective view of the ramp apparatus of FIG. 5.
Figure 7:
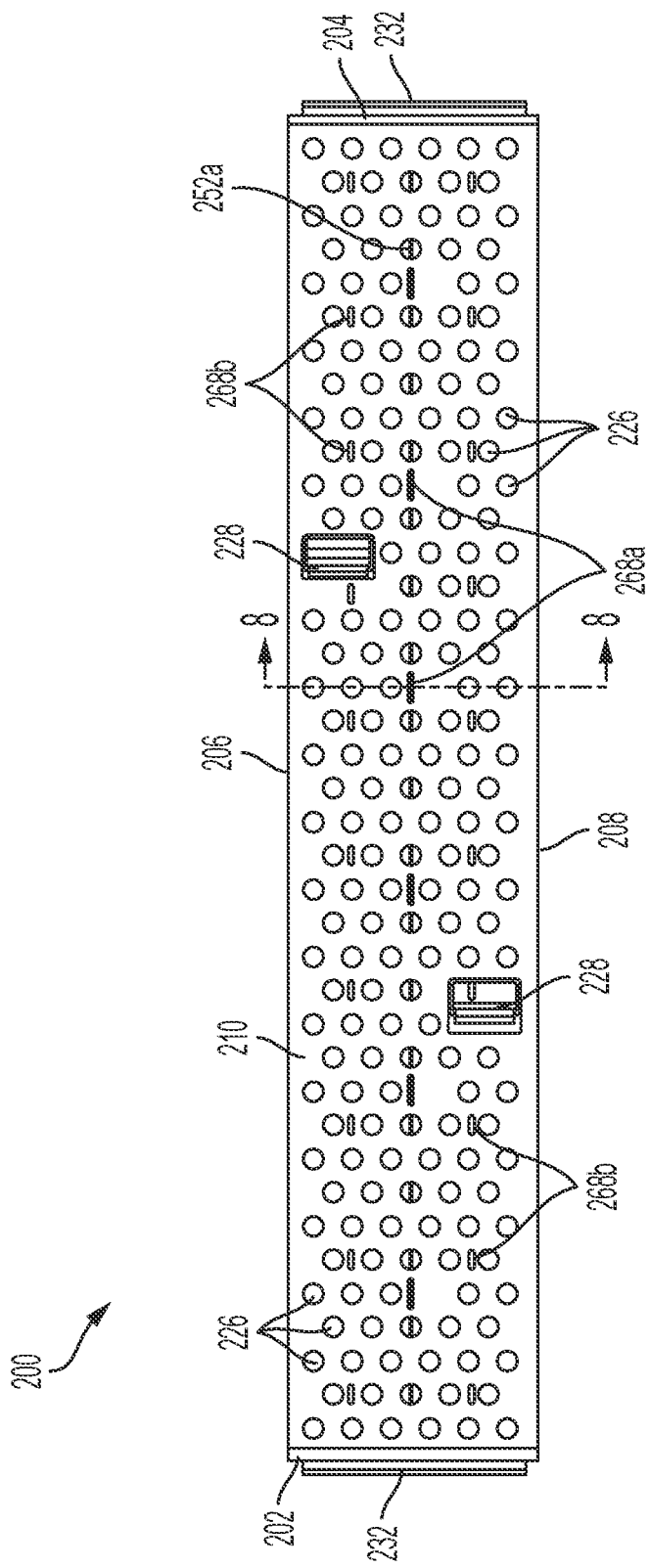
FIG. 7 is a top-down view of the ramp apparatus of FIG. 5.

FIGS. 5-7 depict an exemplary embodiment of a ramp apparatus 200 of the present disclosure configured as a combination ramp and load leveler. The ramp apparatus 200 has a length dimension between a first end 202 and a second end 204 and a width dimension, perpendicular to the length dimension, between a first lateral side 206 and a second lateral side 208, and a height dimension between a top side 210 and a bottom side 212. The ramp apparatus 200 generally includes a main section 214 that extends between truncated sections 216 at the first and second ends 202, 204. The ramp apparatus 200 is formed with one or more beams 220 that extend continuously between the first end 202 to the second end 204. The beams 220 may exemplarily be constructed as an extrusion of metal, for example, aluminum. The beams 220 engage and are connected to an adjacent beam 220 along their respective length dimensions. As will be explained in further detail herein with respect to the cross-sectional view of FIG. 8, the beams 220 may each further include interior brace walls 222 that are configured to increase the strength and rigidity of the ramp apparatus 200. A plate 224 may be secured to the top side 210 of the ramp apparatus 200. The plate 224 may further include a plurality of traction-providing openings 226 and/or drive-over handles 228, as will be explained further herein. It will be recognized that in other examples, the ramp apparatus 200 may include cross treads (FIGS. 1-4), or another traction providing surface, instead of the plate 224, while remaining within the scope of the present disclosure.

The illustrated ramp apparatus 200 additionally includes end hooks 232, each including a retention tube 234. The end hooks 232 are secured to the truncated sections 216 at the respective first and second ends 202, 204. One or more of the retention tubes 234 may be configured to be received in a receiver 90 of the semi-trailer 100 (FIG. 1) when the ramp apparatus 200 is in a ramp configuration or received in stake receivers 48 (FIG. 4) when the ramp apparatus 200 is in a load leveler configuration.

Figure 9:
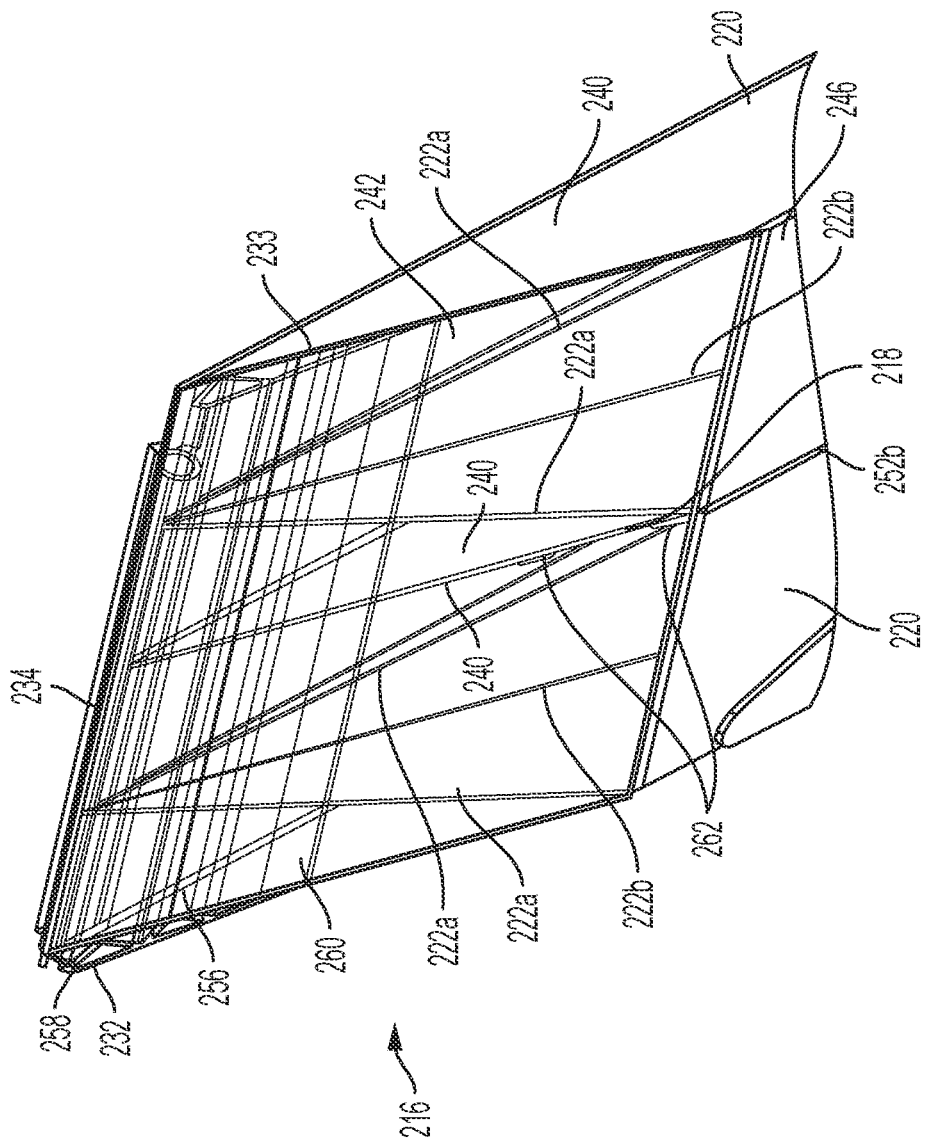
FIG. 9 is a detailed perspective view of an end of the ramp apparatus of FIG. 5 with an end hook in phantom.

Each extruded beam 220 has a generally consistent height along the main section 214 of the ramp apparatus 200. At the truncated sections 216, however, the extruded beams 220 slope upwards from an edge of the bottom wall 246 to an edge of the top wall 242. Referring to FIGS. 7 and 9, the top walls 242 continuously extend along the ramp apparatus 200 from the first end 202 to the second end 204. That is, the top walls 242 extend along the main section 214 and the truncated sections 216. Thus, the top walls 242 of the beams 220 of the ramp apparatus 200 form a continuous surface in both a width dimension and in a length dimension. The bottom walls 246 continuously extend along the main section 214 of the ramp apparatus 200 but terminate at the border between the main section 214 and the truncated sections 216. Each of the truncated section 216 may slope upward at the same angle so that the first end 202 and the second end 204 are symmetrical. Additionally or alternatively, one of the truncated sections 216 may be formed at a different angle than the other truncated section 216. Further still, at least one truncated section may be a compound surface including a plurality of curved and/or planar surfaces.

Figure 8:
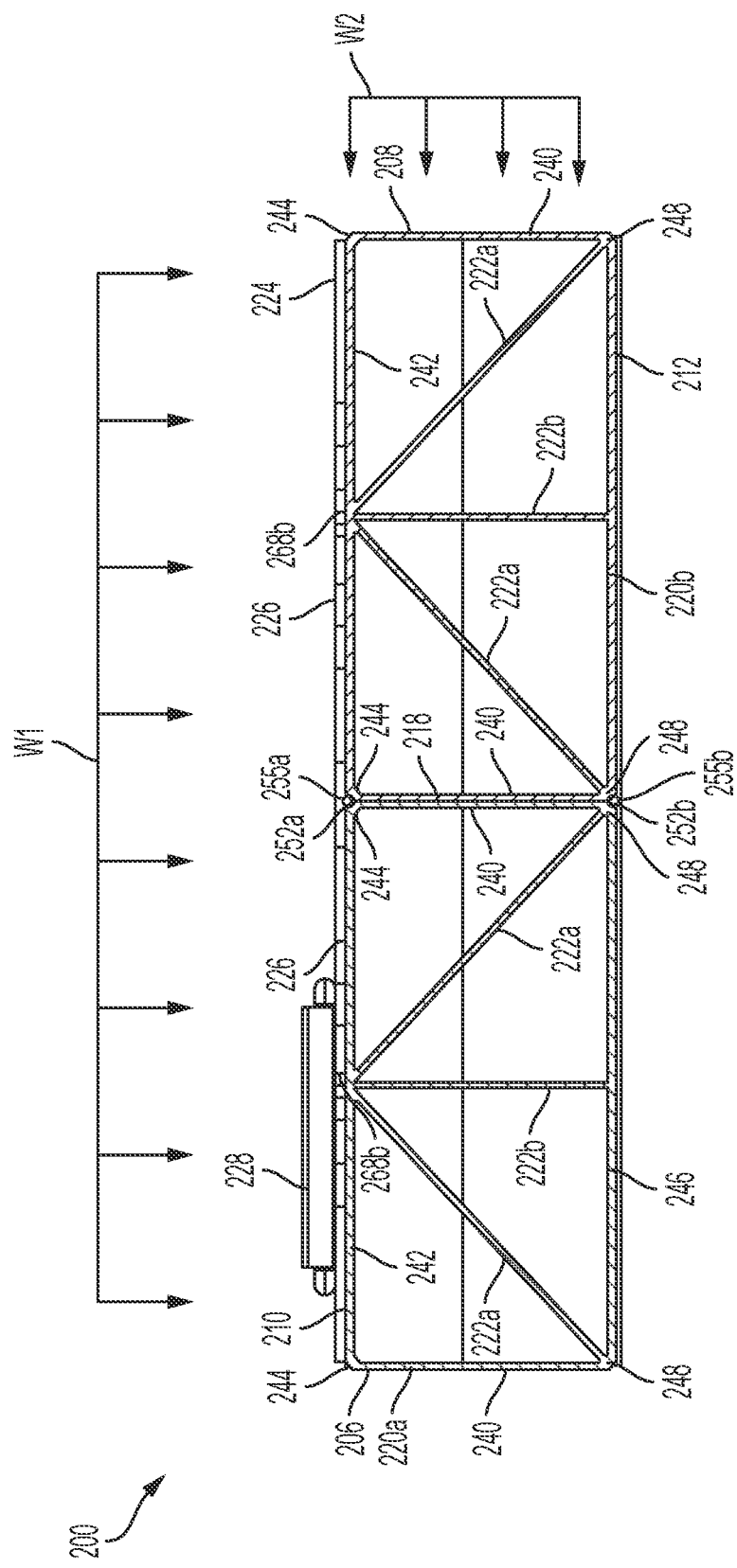
FIG. 8 is a cross-sectional view of the ramp apparatus taken along line 8-8 on FIG. 7.

FIG. 8 is a cross-sectional view taken along line 8-8 of FIG. 7. Each extruded beam 220 may include opposing side walls 240 that intersect with a top wall 242 at top corners 244 and a bottom wall 246 at bottom corners 248 such the beams 220 have a generally rectangular shape and cavity. In the illustrated embodiment, two adjacent beams 220 are arranged in a side-by-side configuration and coupled together lengthwise such that one of the side walls 240 of each beam 220 abuts the other. The abutting side walls 240 form a "double-wall" 218 at the center of the ramp apparatus 200 that acts as a combined, thickened center wall. This may be useful, for example, to increase the structural rigidity of the ramp apparatus 200.

The top and bottom corners 244, 248 of each beam 220 may be chamfered so that grooves 252 are formed at the seam between the adjacent beams 220. An upper groove 252a positioned above the double-wall 218 provided by the abutting side walls 240 may be formed by the top corners 244, and a lower groove 252b positioned below the double-wall 218 may be formed by the bottom corners 248. In the illustrated embodiments, the abutting side walls 240 are welded to each other. The grooves 252 provide a recess that can accommodate a weld bead 255 along the length of the beams 220. This may be useful, for example, so that the weld bead 255 does not protrude from, or minimally protrudes beyond, the adjacent top wall 242 or bottom wall 246. Some embodiments, however, may be configured without chamfered corners that form recessed groves. Additionally or alternatively, the abutting side walls 240 may be coupled together by other means, such as adhesives and/or mechanical fasteners (e.g., nuts and bolts, rivets). Some embodiments of a combination ramp and load leveler may include more than two extruded beams, while some embodiments may be configured with a single, unitary beam that includes one or more of the features of the two illustrated extruded beams.

The extruded beams 220 include brace walls 222 that extend between two of the walls 240, 242, 246 of the beam 220. For example, the illustrated extruded beams 220 include two angled brace walls 222a that extend inward from the bottom corners 248 and intersect with the top wall 242 and a vertical brace wall 222b that extends between the bottom wall 246 and the top wall 242. The angled brace walls 222a and the vertical brace wall 222b may be configured so that they intersect with each other on the top wall 242 at a midpoint between the opposing side walls 240 such that the brace walls 222a, 222b divide the rectangular cavity of the beam 220 into separate triangular cavities and the vertical brace wall 222b bisects the top wall 242 and the bottom wall 246. It will be recognized that the directions of the brace walls 222a may be reversed (e.g. extend from the corners 244 to the bottom wall 246) or other configurations while remaining within the scope of the present disclosure.

Weight arrows W1 represent the weight of a load (e.g., transferred through the wheel or wheels of a vehicle) applied to the ramp apparatus 200 when it is in the ramp configuration. Under this loading condition, the brace walls 222a, 222b distribute the weight of the load throughout the beam 220 (e.g., from the top wall 242 to the bottom wall 246), reduce downward deflection of the top wall 242 toward the bottom wall 246, and increase the overall weight capacity of the beam 220 and thereby the ramp apparatus 200.

Weight arrows W2 represent the weight of a load applied to the ramp apparatus 200 when it is in the load leveler configuration (e.g., for use in trailer transport of wooden telephone poles). Under this loading condition, the top walls 242 and bottom walls 246 transfer the load through the entire height of the ramp apparatus 200 across the length of the ramp apparatus 200. The brace walls 222a, 222b further distribute the weight between the side walls 240 of each beam 220 to the other walls 240, 242, 246 of the beam 220 and transfer the load between adjacent beams by engagement of the respective abutting side walls 240 of each adjacent beam. This increases the overall weight capacity of each beam 220 and the ramp apparatus 200 as a whole. In addition, the brace walls 222a, 222b oppose bending or movement of beam 220 out-of-plane in a direction that is perpendicular to the direction of the weight arrows W2. Thus, the ramp apparatus 200 resists bending or buckling which may occur in the conventional combination ramp and load levelers under similar loading conditions. The beams 220, namely a first beam 220a and a second beam 220b, transfer the load W2 from the first beam 220a to the second beam 220b along the entire length of the beams 220a, 220b when the ramp apparatus 200 is used in the load leveler configuration. This promotes an even distribution of the load W2 when the ramp apparatus 200 is used in the load leveler configuration.

In some embodiments, the ramp apparatus 200 may be used as a load leveler while in an inverted position such that the second beam 220b is positioned above the first beam 220a and the load W2 is applied to the second beam 220b. In such an embodiment, the second beam 220b can operate similarly as described above with respect to the first beam 220a to support the load W2.

FIG. 9 depicts a truncated section 216 with the cover plate 254 removed and the end hook 232 in phantom to reveal the side walls 240 and the brace walls 222 of each extruded beam 220. As shown, the side walls 240 and brace walls 222a, 222b extend from the top wall 242, but terminate in the height dimension consistently with the angle of the truncated sections 216. The lower edges of the brace walls 222 and the side walls 240 may be exposed prior to assembly but are covered by the respective cover plates 245 and the end hooks 232. Each end hook 232 may have a generally wedge-shaped body 256 that extends laterally across the ramp apparatus 200 and narrows from a thick end 258 proximate the retention tubes 234 and an ends 202, 204 of the apparatus 200 to a pointed end 260. A top face 233 engages either the beams 220 directly or is secured to the cover plate 254, in an example wherein the cover plate 254 extends for the length of the truncated sections 216, while in other examples, the cover plate 254 and the end hook, 232 each secured directly to a portion of the beams 220 in the truncated section 216. Weight reduction holes may extend through the body 256 to reduce the weight of the end hook 232 while maintaining its strength. The end hooks 232 may be secured to the beams 220 by welds formed around at least a portion of the perimeter of the end hooks 232. For example, each of the end hooks 232 may be coupled to at least one of the top walls 242, the side walls 240 at the lateral sides 206, 208 of the ramp apparatus 200, the abutting side walls 240, the brace walls 222 and the bottom walls 246 by a weld or welds. Additionally or alternatively, the end hooks 232 may be secured to at least one of the beams 220 by adhesives and/or mechanical fasteners (e.g., nuts and bolts, rivets).

The cover plate 254 may be generally planar and extends across the extruded beams 220 for at least a portion of the truncated section 216. In another example, the cover plate 254 extends from the pointed end 260 of the end hook 232 to the bottom walls 246 of the extruded beams 220 at the edge of the truncated section 216. The cover plate 254 extends between the lateral sides 206, 208 of the ramp apparatus 200 and may include at least one weld receiving opening 262 formed in the body of the cover plate 254 to provide access to the sloped lower edges of the brace walls 222 and/or the side walls 240 of at least one of the beams 220. In the illustrated embodiments, the weld receiving opening 262 are arranged in a line along a lateral midpoint of the cover plate 254 so that the weld receiving opening 262 are aligned with the abutting side walls 240 of the two beams 220. This may be useful, for example, so that a single weld made in a weld receiving opening 262 can couple the cover plate 254 to each of the beams 220 and couple the abutting side walls 240 to each other. The cover plate 254 may also be secured to the beams by welds formed around the perimeter of the cover plate 254. For example, the cover plates 254 may each be coupled to at least one of the top walls 242, the side walls 240 at the lateral sides 206, 208 of the ramp apparatus 200, and the bottom walls 246 by a weld or welds. Additionally or alternatively, the end pieces 232 may be secured to at least one of the beams 220 by adhesives and/or mechanical fasteners (e.g., nuts and bolts, rivets).

Some embodiments of a ramp apparatus may include at least one end hook and/or cover plate that is different than those of the illustrated embodiments. For example, a cover plate may include at least one weld slot formed at a different location in the cover plate's body, and/or at least one of the illustrated weld slots may be omitted. Embodiments of an end hook may include at least one weld slot configured to allow the end piece to be welded to at least one of the abutting side walls and/or at least one of the brace walls. In some embodiments, a cover plate may be integrally formed with an end piece, and/or at least one of the end pieces and/or at least one of the cover plates may be omitted.

Figure 10:
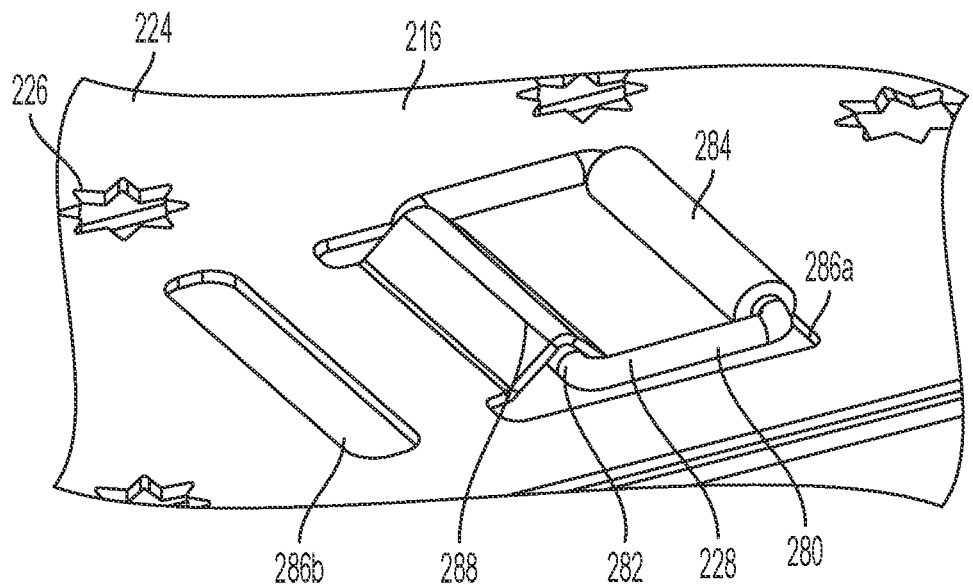
FIG. 10 is a detailed perspective view of the ramp apparatus with a handle in a first position.
Figure 11:
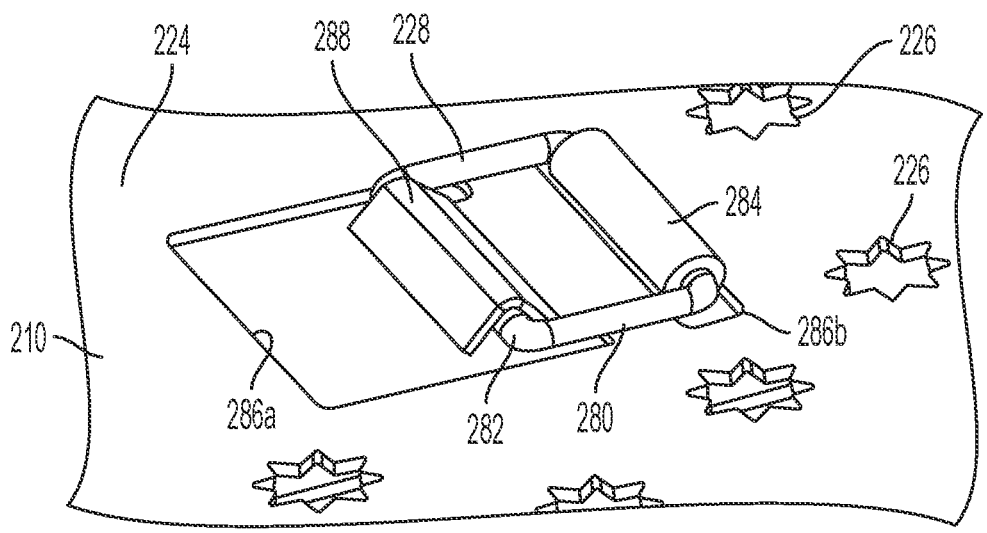
FIG. 11 is a detailed perspective view of the ramp apparatus with the handle in a second position.

As previously mentioned, embodiments of a combination ramp and load leveler may include at least one plate configured to strengthen the ramp secured to the top or bottom side of the ramp. For example, a plate 224 may be positioned on the top side 210 of the ramp apparatus 200 and can extend in a length dimension between the first and second ends 202, 204 and in a width direction between the first and second lateral sides 206, 208 of the ramp apparatus 200. A plurality of openings 226 configured to provide traction to an object (e.g., a vehicle wheel) supported by the ramp apparatus 200 while it is in the ramp configuration may be arranged in an array across the body of the plate 224. The traction openings 226 may be evenly spaced across the plate 224 to provide consistent traction over the full length and width of the ramp apparatus 200. While the openings 226 are depicted as circular cutouts (e.g. FIG. 5), some traction-providing openings may be configured with a different shape and/or size. For example, traction openings may be configured as star-shaped openings (e.g. FIGS. 10, 11) that are punched into the plate 224. In such an embodiment, the punching process may cause the corners of star-shaped openings to flare outward and extend past the planar plate body. These flared portions of the openings may be engaged by an object on the plate 224 to provide traction. Some embodiments may have at least one punched opening that is in a different shape (e.g., circular, triangular, rectangular, and/or openings). Additionally or alternatively, a different process may be used to form traction-providing openings in the plate.

The plate 224 may be coupled to the beams 220 at multiple locations in order to help distribute the weight of a load on the ramp apparatus 200, and to increase the strength and/or rigidity of the ramp apparatus 200. The plate 224 may be secured to the beams 220 by welds formed around the perimeter of the plate 224. For example, the plate 224 may be welded to the top walls 242 of the beams 220 at the first and second ends 202, 204 and/or the top corners 244 of the beams 220 along at the lateral sides 206, 208 of the beams 220. Additionally or alternatively, the plate 224 may be secured to at least one of the beams 220 by adhesives and/or mechanical fasteners (e.g., nuts and bolts, rivets).

The plate 224 may optionally include a plurality of weld-receiving openings 268 through which the plate 224 can be welded to at least one of the beams 220. In the illustrated embodiments, for example, a plurality of weld-receiving openings 268 in the form of slots extend through the plate 224. When the plate 224 is positioned on top of the extruded beams 220, the weld-receiving openings 268 expose a portion of the beams 220 so that the plate 224 can be welded to the beams 220. The weld-receiving openings 268 may be arranged in an array so that the plate 224 can be coupled to the beams 220 at multiple locations. In the illustrated embodiments, the array of openings may include a group of weld-receiving openings 268a that are arranged in a row that extends along the seam between the two beams 220 so that the weld-receiving openings 268*a* provide access to the upper groove 252*a*. Using the seam weld-receiving openings 268*a*, a single weld within each weld-receiving opening 268*a* may be used to couple the plate 224 and both of the extruded beams 220. Additionally or alternatively, welds formed through the weld-receiving openings 268*a* may be used to secure the two beams 220 to each other and to the plate 224. The illustrated embodiment of the plate 224 includes six weld-receiving openings 268*a* that are evenly spaced between the first end 202 and the second end 204 of the ramp apparatus 200 along the seam between the two beams 220. Some embodiments, however, may include a different number of weld-receiving openings, at least one of which may have a different shape and/or size than those illustrated.

The array of weld-receiving openings 268 in the plate 224 may include at least one row of weld-receiving openings 268*b* positioned to the left and/or right of the weld-receiving openings 268*a*. Each of the row extends along the length dimension of the ramp apparatus 200 and is aligned with a lateral midpoint of one of the beams. Thus, as illustrated in FIG. 8, the weld-receiving openings 268*b* are in alignment with the intersection of the brace walls 222 across the top wall 242. Welds formed in the weld-receiving openings 268*b* create a connection between plate 224 and the beams 220 that may allow a force applied to the plate 224 to be transferred into the truss structure provided by the brace walls 222. This may be useful, for example, in order to evenly distribute the weight of a load placed on the ramp apparatus 200 in the ramp configuration. Each row of weld-receiving openings 268*b* in plate 224 includes ten weld-receiving openings 268*b* that are evenly spaced between the first end 202 and the second end 204 of the ramp apparatus 200. Some embodiments, however, may include a different number of weld-receiving openings, at least one of which may have a different shape and/or size than the illustrated weld-receiving openings 268*b*.

Some embodiments of a ramp apparatus may include a plate with a different configuration of weld-receiving openings. For example, a plate may be configured with at least one weld-receiving opening as described above omitted. A plate may include only seam weld-receiving openings or only truss weld-receiving openings. Additionally or alternatively, a plate may include at least one weld-receiving opening that has a different shape than the illustrated slots and/or at least one weld-receiving opening arranged in a different position or orientation than those of the illustrated embodiments. Some embodiments of a plate may include at least one weld-receiving opening that is also configured to provide traction to an object on the plate.

Some examples of a ramp apparatus 200 may include handles 228 that may provide an easy way to pick up, carry, and position the ramp apparatus 200. As shown, for example, in FIGS. 5 and 7 and in further detail in FIGS. 10 and 11, handles 228 are positioned on the top side 210 of the ramp apparatus 200 and are spaced apart from each other so that the ramp apparatus may be comfortably lifted by both handles. The handles 228 may be provided in a drive-over configuration as described herein that can withstand the weight of a vehicle or other object as it travels across the ramp apparatus 200 without sustaining damage or causing damage to the vehicle or other object on the ramp apparatus 200. In an example, the handle 228 may have a body 280 with an attachment side 282 that is rotatably secured to the top side 210 of the ramp apparatus 200 and a second side, opposite the attachment side 282, may include a grip portion 284, which may include a tubular component of metal or elastomeric material.

Figure 13:
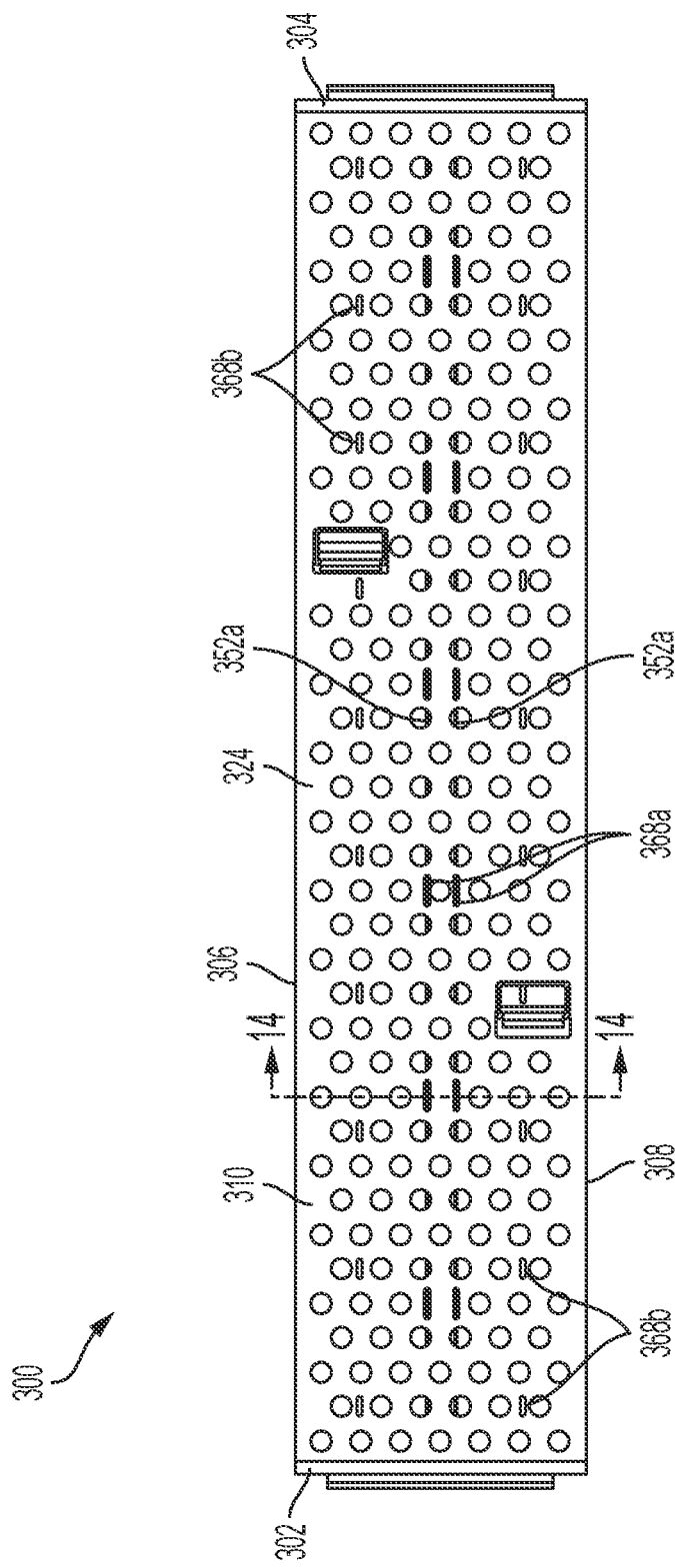
FIG. 13 is a top-down view of the ramp apparatus of FIG. 12.

The handles 228 are configured to be secured to the ramp apparatus 200 by a clamping member 288 of the plate 224. The clamping member 288 may include two planar segments that are bent around the attachment side 282 of the handle 228 to rotatably secure the handle body 280 to the top wall 242 of one of the extruded beams 220. The plate 224 may include handle openings 286 configured to receive the handle 228 when not held by a user. This may be useful, for example, to reduce the height of the handle 228 above the top of the plate 224 when the handle is not in use. As illustrated in FIG. 13, a first handle opening 286*a*, which is partially covered by the clamping member 288, may be configured to receive the handle body 280, including the attachment side 282 and the gripping portion 284, when the handle is resting on a first side of the clamping member 288. When the handle 228 is resting on the opposite side of the clamping member 288, as illustrated in FIG. 14, the gripping portion 284 of the handle 228 may be received in a second handle opening 286*b* configured to receive just the gripping portion 284 while the attachment side 282 is received in the first handle opening 286 beneath the clamping member 288.

Some embodiments of a ramp apparatus may have a different handle arrangement. For example, a ramp apparatus may include at least one handle that is shaped, sized, positioned, and/or oriented differently than those of the illustrated embodiment. A handle may be secured to the ramp apparatus by at least one of a different part of the plate, a part of an extruded beam, and an additional component configured to secure the handle to the ramp apparatus. Additionally or alternatively, some embodiments may include first and second handle openings that are integrated into a single opening, and some embodiments may omit at least one of the first and second handle openings.

Figure 12:
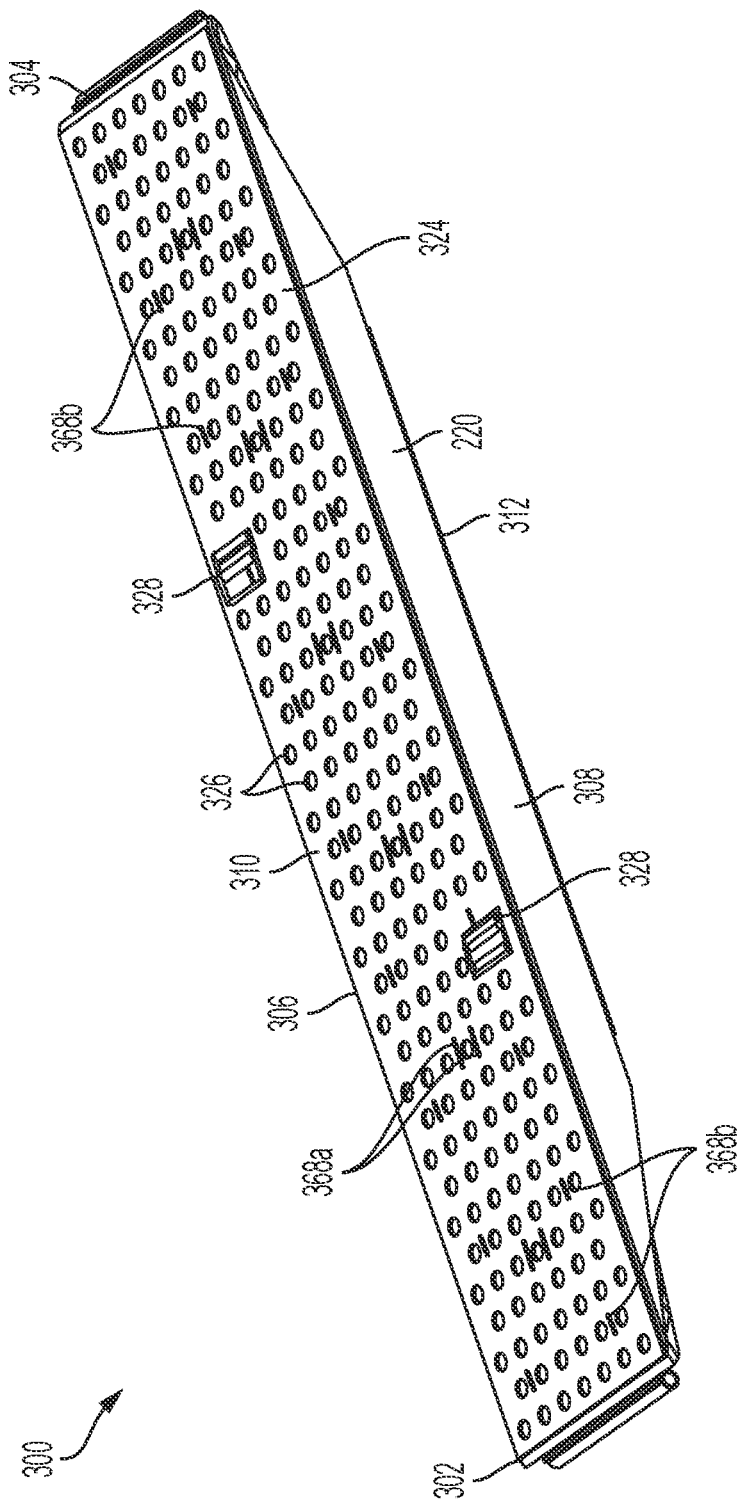
FIG. 12 is a perspective view of another exemplary embodiment of ramp apparatus configured as a combination ramp and load leveler.

While the ramp apparatus 200 of FIGS. 5-9 include two extruded beams 220 that may be generally identical, some embodiments may include at least one additional extruded beam which may be the same or different than the other elongated beams. For example, as illustrated in FIGS. 12-14, a ramp apparatus 300 configured as a combination ramp and load leveler may include at least one additional extruded beam 320 positioned between the two extruded beams 220 as previously described above with respect to FIGS. 5-9. Thus the ramp apparatus 300 may be considered to be a variation of the ramp apparatus 200 as previously described. It will be recognized that like reference numerals between the figures are used to reference like components. The additional beam 320 increases the width dimension the ramp apparatus 300 between the first lateral side 306 and the second lateral side 308 thereof. The spacer beam 320 is engaged with and coupled to the two adjacent extruded beams 220 and extends between the first end 302 and the second end 304 of the ramp apparatus 300.

Figure 14:
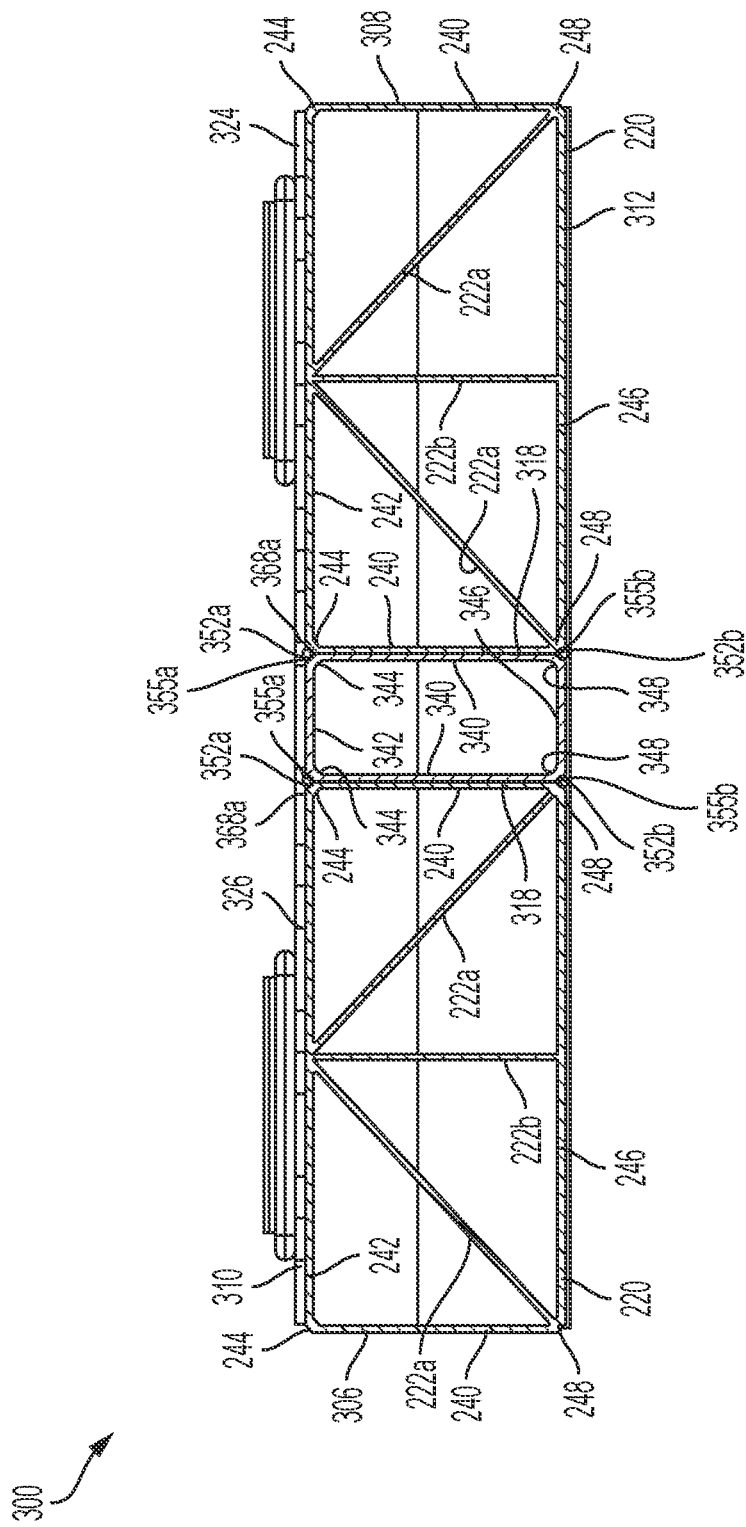
FIG. 14 is a cross-sectional view of the ramp apparatus taken along line 14-14 of FIG. 13.

Looking to FIG. 14, which is a cross-sectional view taken along line 14-14 of FIG. 13, the spacer beam 320 includes opposing side walls 340 that intersect with a top wall 342 at top corners 344 and a bottom wall 346 at bottom corners 348 such the spacer beams 320 has a generally rectangular shape and interior cavity. The spacer beam 320 is arranged in a side-by-side configuration with the adjacent beams 220 such that each of the opposing side wall 340 of the spacer beam abuts one of the side walls 240 of an adjacent beam 220. The two pairs of abutting side walls 240, 340 form two thickened double-walls 318 that extend the length of the ramp apparatus 300. The length of the side walls 340 of the spacer beam 320 may be selected so that the height dimension of the spacer beam 320 is substantially the same as the height dimension of the adjacent beams 220. The length of the top and bottom walls 342, 346 may be selected based on the desired overall width of the ramp apparatus.

As with the two extruded beams 220 including brace walls 222, the top corners 344 and the bottom corners 348 of the spacer beam 320 may be chamfered so that grooves 352 are formed at the seam between the spacer beam 320 and each of the adjacent beams 220. The three extruded beams 220, 320 may therefore be joined with each other by welds 355a formed in the upper grooves 352a and welds 355b the lower grooves 352b. Additionally or alternatively, the abutting side walls 240, 340 may be coupled together by other means, such as adhesives and/or mechanical fasteners (e.g., nuts and bolts, rivets).

In some embodiments, a plate may include additional weld slots. For example, referring to FIGS. 15 and 17, a plate 324 including traction-providing features may be positioned on the top walls 242, 342 of the extruded beams 220, 320. A plurality of weld slots 368 may be formed through the body of the plate 324 and can be used to couple the plate 324 to the extruded beams 220, 320 at various locations. The array of weld slots 368 may include two rows of weld-receiving openings 368a arranged along the length of the ramp apparatus 300 and spaced laterally apart from each other so that one row of weld-receiving openings 368a is positioned over each of the upper grooves 352a between the spacer beam 320 and the adjacent beams 220. Welds formed in the seam weld-receiving openings 368a may couple the spacer beam 320 to one of the adjacent beams 220 and the plate 324 to the extruded beams 220 and the spacer beam 320.

The plate 324 may include at least one row of truss weld-receiving openings 368b offset to the left or right of the seam weld-receiving openings 368a. Each column of truss weld-receiving openings 368b may be positioned so that the truss weld-receiving openings 368b are in alignment across the top wall 242 from the intersection of the brace walls 222 of each beam 220.

In the illustrated embodiments of a ramp apparatus 300, the spacer beams 320 does not include any internal brace walls. Some embodiments, however, may include a spacer beam with at least one brace wall extending between any two of the top wall, the bottom wall, and the two side walls of the spacer beam.

Figure 15:
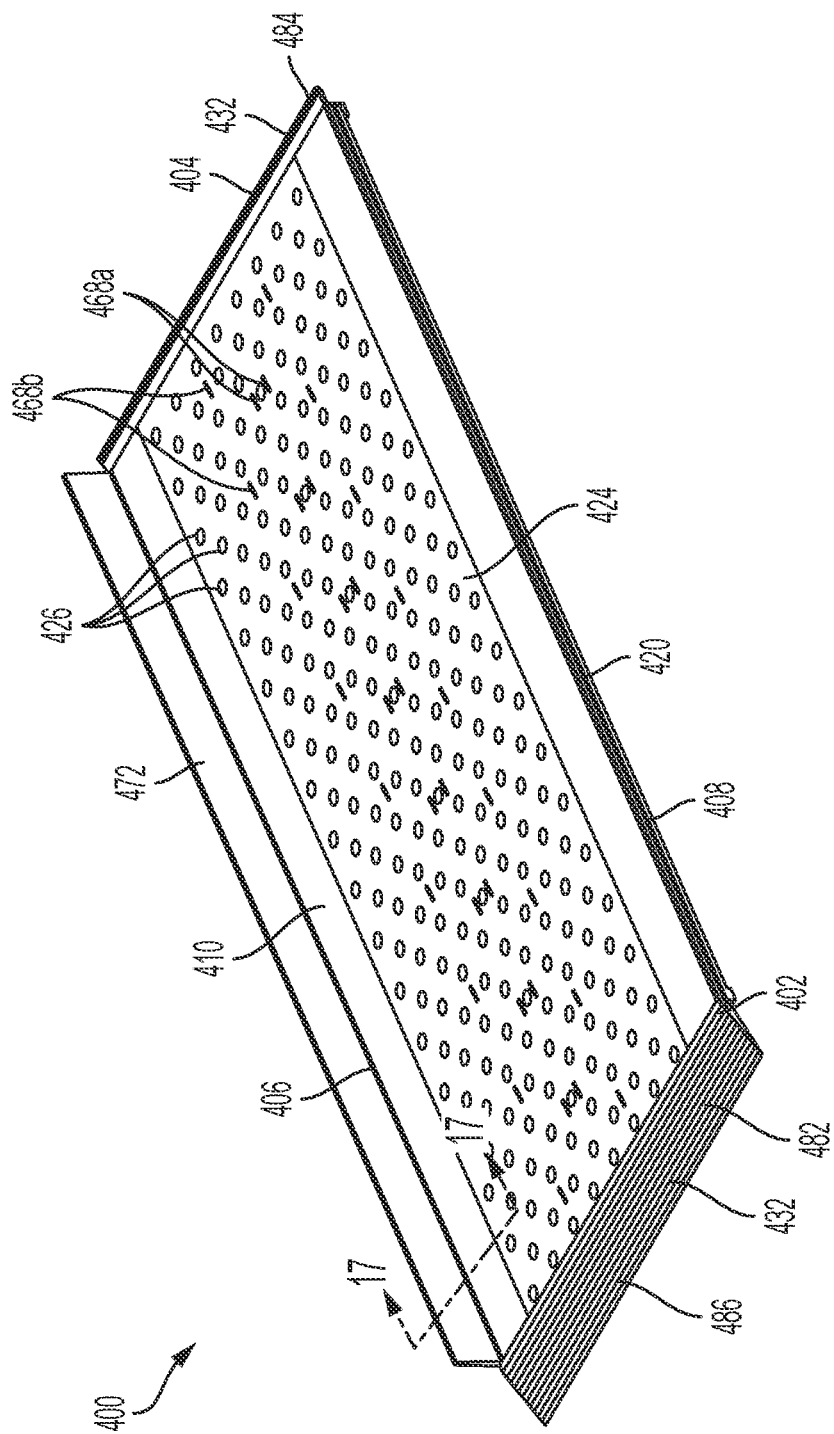
FIG. 15 is a perspective view of another exemplary embodiment of ramp apparatus configured as a combination ramp and load leveler.
Figure 16:
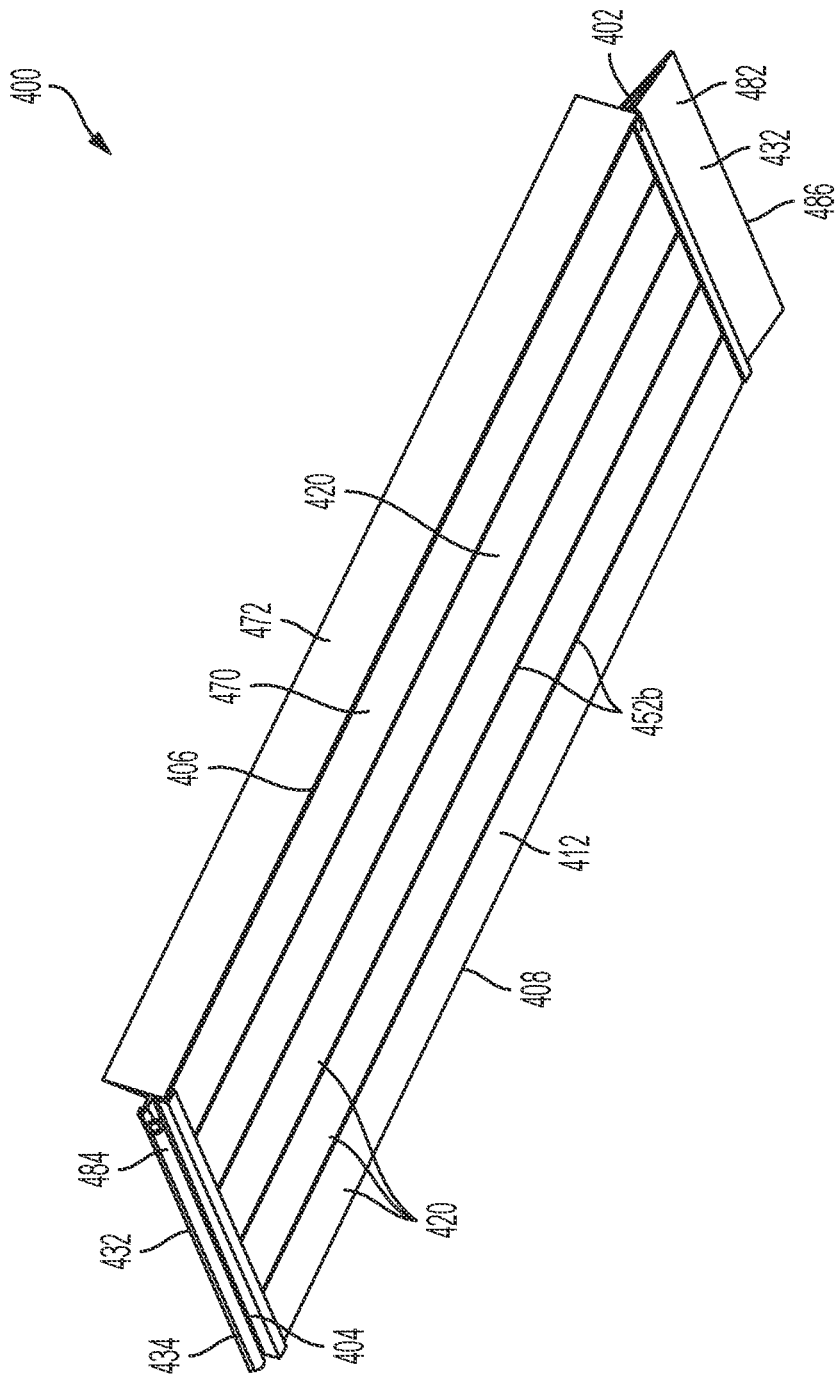
FIG. 16 is another perspective view of the ramp apparatus of FIG. 15.
Figure 17:
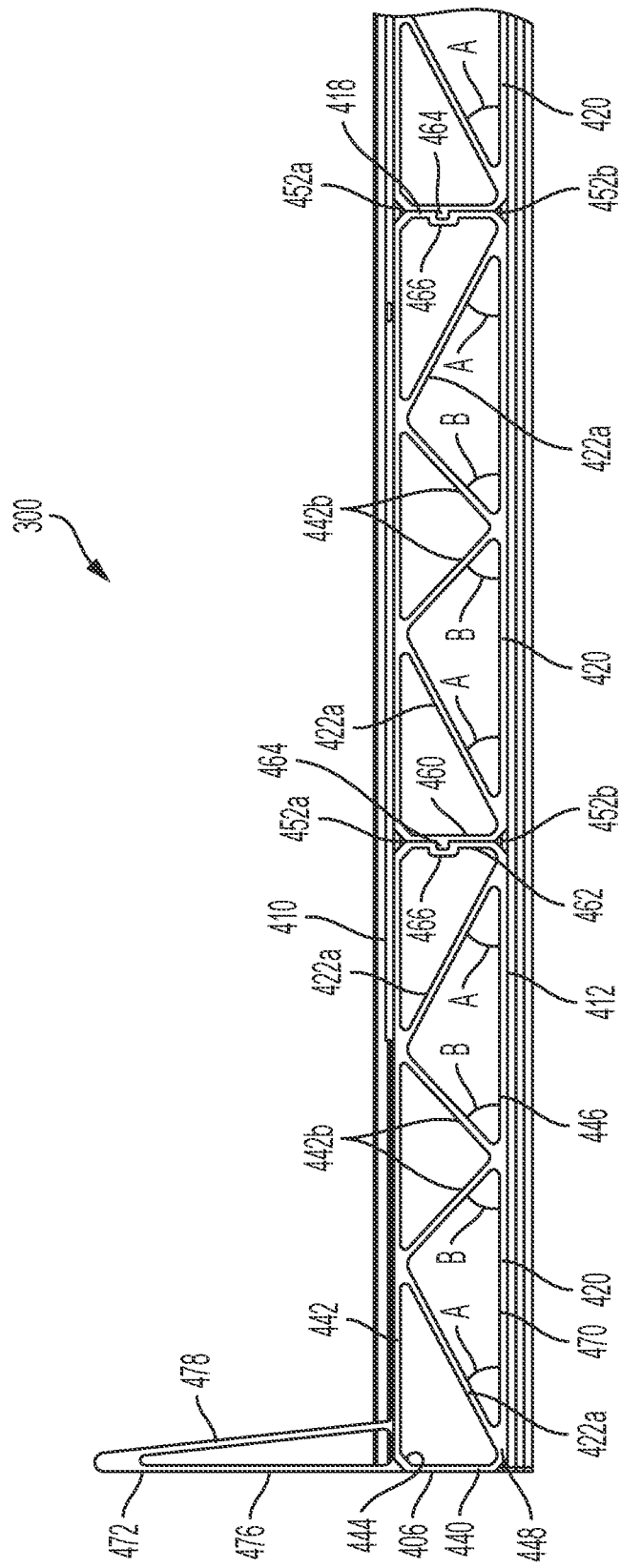
FIG. 17 is a detailed cross-sectional view of the ramp apparatus of FIG. 15 along line 17-17 of FIG. 15.

FIGS. 15-17 illustrate another example of a ramp apparatus 400. The ramp apparatus 400 providing examples of further modifications to the examples of ramp apparatus as described herein. The ramp apparatus 400 includes a plurality of extruded beams 420 that extend along a length dimension of the ramp apparatus between a first end 402 and a second end 404. The extruded beams 420 may be arranged in a side-by-side configuration so that a width dimension of the ramp apparatus 400 between a first lateral side 406 and a second lateral side 408 is provided by the extruded beams 420. The extruded beams 420 may have a generally consistent cross-section between the first and second ends 402, 404. In some embodiments, at least one extruded beam 420 may be configured as a curb beam 470 including a curb wall 472 configured to prevent an object from falling off the first or second lateral side 406, 408 of the ramp apparatus 400. End pieces 432 may be secured to at least one of the first and second ends 402, 404 and may be configured to facilitate connection of the ramp apparatus 400 to another object and/or provide a smooth transition between the ramp apparatus 400 and the surrounding surface(s).

FIG. 17 provides a detailed partial cross-sectional view taken along line 17-17 of FIG. 15. The beams 420 include interior brace walls 422 that are configured to increase the strength and rigidity of the ramp apparatus 400. Each extruded beam 420 may include opposing side walls 440 that intersect with a top wall 442 at top corners 444 and a bottom wall 446 at bottom corners 448 such the beams 420 have a generally rectangular shape and cavity. In the illustrated embodiment, the extruded beams 420 are arranged in a side-by-side configuration and coupled together lengthwise such that at least one of the side walls 440 of each beam 420 abuts the side walls 440 of the adjacent beam(s) 420. The abutting side walls 440 form a double-wall 418 between each extruded beam 420 that acts as a combined, thickened dividing wall. The top and bottom corners 444, 448 of each beam 420 may be chamfered so that grooves 452 are formed at the seam between each of the beams 420. An upper groove 452a positioned above each of the double-walls 418 may be formed by the top corners 444, and a lower groove 452b positioned below each of the double-walls 418 may be formed by the bottom corners 448.

Each of the extruded beams 420 may include brace walls 422 that extends between two of the walls 440, 442, 446 of the beam 420. For example, each of the illustrated extruded beams 420 way include two brace walls 422a and two brace walls 422b that extend between the top and bottom walls 442, 446. Each of the brace walls 422a extend at an angle A relative to the wall 446 inward from corners 448 towards the wall 442. The brace walls 422b each extend at an angle B relative to wall 446 towards the wall 442, exemplarily intersecting the brace walls 422a at the wall 442. In an example, the brace walls 422 extend from a midpoint of wall 446.

Some embodiments a combination ramp and load leveler may include extruded beams that are in an inverted configuration so that the cross-sectional profile of the extruded beams is upside down relative to the illustrated beams. Some embodiments may of a ramp apparatus may include at least one extruded beam in an inverted orientation secure to at least one beam in a non-inverted orientation. Some embodiments of a combination ramp and load leveler may include at least one extruded beam with a different brace wall configuration than those of the illustrated beams. For example, at least one of the first brace walls and/or at least one of the second brace walls may intersect with the top wall, the bottom wall, and/or the side walls at a different location than in the illustrated embodiments. An extruded beam may include at least one additional brace wall that extends any two of the top wall, the bottom wall, one of the opposing side walls, one of the first brace walls, and/or one of the second brace wall. Additionally or alternatively, at least one of the extruded beams may be configured without at least one of the brace walls as previously described.

The beams 420 may further include engagement features configured to promote connection between adjacent beams during construction and use. At least one of the side walls 440 of each extruded beam 420 may be configured as a tongue wall 460 or a groove wall 462. Each tongue wall 460 may include a tongue member 464 that projects laterally outward from the side wall 440. The groove walls 462 may include grooves 466 that correspond to the tongue members 464 recessed into the corresponding side wall 440. The grooves 466 are configured to be engaged by the tongue member 464 from an adjacent beam 420 to couple the tongue wall 460 of one beam 420 to the groove wall 462 of another beam 420. Engagement between the tongue member 464 and the groove 466 may restrict movement relative movement of connected beams 420 in at least one of the vertical, lateral, and longitudinal directions. In the illustrated embodiments, the tongue member 464 and the groove 466 have a generally rectangular profile and engagement between the tongue member 464 and the groove 466 restricts vertical movement of the beams 420 relative to each other. Some embodiments may be configured with differently shaped tongue members and corresponding grooves that additionally or alternatively restrict lateral movement of adjacent beams relative to each other. This may be useful, for example, to couple adjacent extruded beams without using additional welds, fasteners and/or adhesives.

In some embodiments, the tongue members 464 and the corresponding grooves 466 (or any other engagement features) may be formed along substantially the entire length of the extruded beam 420. Other embodiments may include a tongue member 464 and groove 466 that extend along a portion of the extruded beams 420, and/or a plurality of corresponding tongue member 464 and groove 466 segments spaced along the length of the extruded beams 420. Additionally or alternatively, at least one of the extruded beams may have an engagement feature that is different than those of the illustrated embodiments. For example, a tongue wall may have a plurality of tongue members and a groove wall may have a plurality of grooves configured to receive the tongue members. While the illustrated extruded beams 420 are configured so that the left-side wall 440 is a tongue wall 460 and the right-side wall 440 is a groove wall 462, some embodiments may include a left-side wall configured as a groove wall and a right-side wall configured as a tongue wall. Further still, an extruded beam may include at least one side wall that does not have an engagement feature.

In a further example, the extruded beam 420 positioned at the first lateral side 406 of the ramp apparatus 400 may be configured as a curb beam 470 with a curb wall 472 projecting upward from the top wall 442 of the curb beam 470 and extending along the length of the beam 470. Further examples of the curb beams are described in U.S. Pat. No. 10,710,824, which is hereby incorporated by reference in its entirety. The curb wall 472 may have a generally triangular body with an exterior wall 476 that is flush with the side wall 440 of the curb beam 470 and an interior wall 478 that angles downward and laterally inward from a tip of the curb wall 472 back to the top wall 442. The curb wall may provide a stop member that prevents an object from traveling laterally off the top side 410 of the ramp apparatus 400. This may be useful, for example, to prevent an object from incidentally sliding, rolling, or otherwise traveling off of the ramp apparatus 400. Since the curb wall 472 is configured to be at the first lateral side 406 of the ramp apparatus, the curb beam 470 may include only one side wall 440 with an engagement feature. In the illustrated embodiment, the side wall 440 opposite the curb wall 472 is configured as a groove wall 462. Other embodiments of a curb beam 470 may be configured with a tongue wall 460 opposite the side of the curb wall 472. Further still, a curb beam may include engagement features positioned on both of its opposing side walls.

The illustrated curb wall 472 is integrally formed with the curb beam 470 and has a hollow interior, which may be useful to reduce weight. Other embodiments, however, may have a curb wall with a solid body and/or a separate curb wall component that may be attached to an extruded beam. For example, a ramp apparatus may be configured with a curb wall attachment that includes an engagement feature configured to be engaged with the tongue wall 460 and/or the groove wall 462 of an extruded beam.

Some embodiments of a ramp apparatus include a different curb wall configuration. For example, a ramp apparatus may include a curb beam positioned at the second lateral side of the ramp apparatus while the extruded beam at the first lateral side does not include a curb wall. A ramp apparatus may include a first curb beam with a curb wall positioned at the first lateral side and a second curb beam with a curb wall positioned at the second lateral side. Further still, some embodiments may include a curb wall positioned between the lateral sides of a ramp apparatus.

Embodiments of a ramp apparatus may include a variety of different end pieces that may be attached to at least one of the first and second ends of the ramp apparatus. As illustrated in FIGS. 15 and 16, the ramp apparatus 400 includes an end piece 432 configured as a transition attachment 482 at the first end 402 and a hook attachment 484 at the second end 404. The transition attachment 482 may be configured to provide a smooth transition onto the top side 410 of the ramp apparatus 400 from the surrounding environment. The length, angle, and shape of the transition attachment 482 may be selected based on at least one of the anticipated angle of the ramp apparatus 400 during use, the anticipated surfaces the ends 402, 404 ramp apparatus 400 will be connected to, or any other criteria. The hook attachment 484 may include a retention tube 434 that is configured to be received in a receiver 90 of the semi-trailer 100 when the ramp apparatus 400 is in a ramp configuration or in stake receivers 48 when the ramp apparatus 400 is in a load leveler configuration. The hook attachment 484 may also be configured to secure an end 402, 404 of the ramp apparatus 400 to a different structure to secure the ramp apparatus 400 in place while being used. The end pieces 432 may be secured to an end 402, 404 of the ramp apparatus 400 by welds, mechanical fasteners, adhesives, and any other form of attachment. While the illustrated embodiment includes a transition attachment 482 at the first end 402 and a hook attachment at the second end 404, some embodiments may be differently configured. For example, a ramp apparatus may include a hook attachment secured to the first end and a transition attachment secured to the second end. Alternatively, a ramp apparatus may be configured with either hook ends or transition ends.

Figure 18:
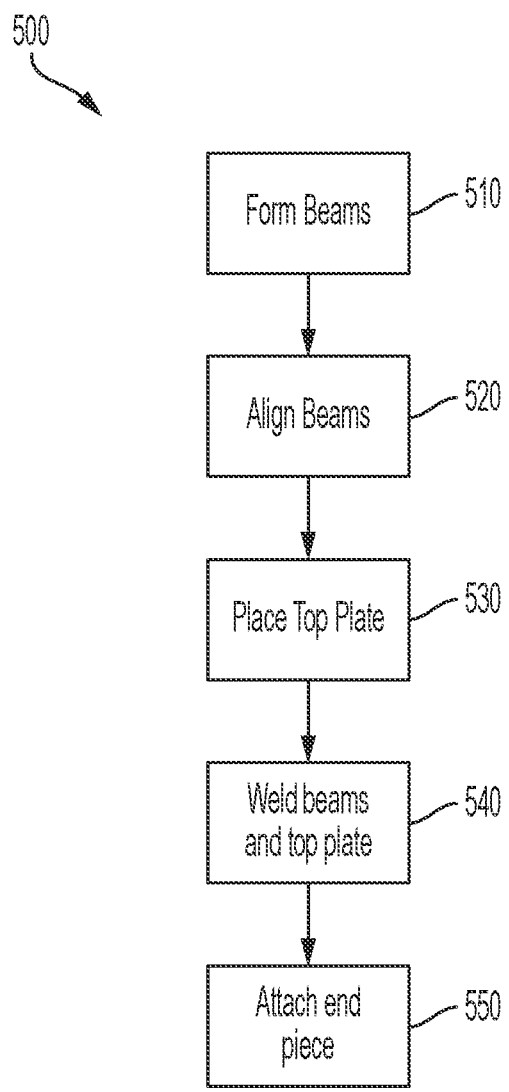
FIG. 18 is a flow chart depicts an example of a method of constructing a combination ramp and load leveler apparatus.

FIG. 18 is a flow chart that presents an example of a method 500 of constructing a ramp apparatus, for example any of the ramp apparatus 200, 300, 400 as described herein including but not limited to ramp apparatus which may be used as a combination ramp and load leveler. The method 500 may include a step for forming at least one beam. For example, in step 510 a first beam and a second beam may be from a single elongated beam having a length at least twice as long as the desired length of the first and second beams. First, the elongated beam may be formed using an extrusion process, a casting process, and/or any other metal forming process. Once formed, the elongated beam may be cut into shorter segments to form the first and second beams. In examples of beams, which include truncated sections as previously described, the extrusions may be cut on an angle, while examples of beams without truncated sections may be cut in a plane perpendicular to the length of the extrusion.

For embodiments of a ramp that do include a truncated section, step 510 for forming the first and second beams may include making a plurality of angled cuts along the length of the elongated beam. For example, forming the first and second beams may include making three evenly spaced apart cuts in the elongated beam at complementary angles. The first cut may be made at a first angle that is oblique angle relative to the top wall to defining a first end of the first beam, the second cut may be made at a second angle that is complementary to the first angle to define a second end of the first beam and a first end of the second beam, and the third cut may be made at the first angle to define a second end of the second beam. Some embodiments may include steps for making additional cuts to create additional beams. For example, five cuts made at alternating complementary angles may be made in an elongated beam to form two beams in an inverted configuration and two beams in a non-inverted configuration.

Once the first and second beams have been formed or otherwise provided, the beams may be aligned in a lengthwise configuration in step 520. In some embodiments, step 520 may include moving the beams so that a one of the opposing side walls of the first beam abuts a one of the side walls of the second beam. When producing a ramp apparatus including beams with engagement features, an engagement feature on the side wall of the first beam may be moved into engagement with an engagement feature on the second beam. For example, a tongue member projecting from a tongue wall may be received in the groove formed in a groove wall. Additionally or alternatively, step 520 may include arranging more than two beams in a lengthwise configuration, such as arranging a spacer beam between two beams. Further still, some embodiments of step 520 may include arranging a curb beam including a curb wall at a lateral side of the ramp apparatus. In some embodiments, however, the step 520 for aligning the first and second beams may omit at least one of the described steps and/or include at least one additional step.

Once the beams are arranged in a lengthwise configuration, a plate may be place on the top surface of the beams at step 530. Step 530 may include orienting the plate so that a front and back end of the plate are aligned with the front and back edges of the beams and the lateral edges of the plate are aligned with the exterior side walls of the beams positioned at the lateral sides of the ramp apparatus. Step 530 of arranging a plate on the beams may include positioning weld slots in the plate over a desired location on the beams. For example, the plate may be positioned so that at least one seam weld slot is positioned over a seam between two adjacent beams. Additionally or alternatively, at least truss weld slot may be positioned over an intersection between internal brace walls of a beam and the top wall of the beam.

Some embodiments of a method 500 for fabricating a ramp apparatus may include additional step relating to the placement of the plate. For example, some embodiments may include forming at least one traction-providing opening in the body of the plate through a punching process and/or another method. Step 530 may include securing a handle to the ramp apparatus. In such an embodiment, securing the handle to the ramp apparatus may include steps for forming at least one handle opening in the plate, forming a clamping member in the plate, and rotatably securing the handle to the ramp apparatus by clamping the handle to at least one of the beams with the clamping member. In some embodiments of the method 500, the step 530 of arranging a plate on a beam may omit at least one of the described steps and/or include at least one additional step.

After the plate is positioned on the first and second beams in step 530, the beams and the plate me be welded together at step 540. Coupling the beams to each other may include forming a weld in recessed grooves that extend from the first ramp end to the second ramp end at the seam(s) between the adjacent extrude beams. For example, adjacent beams may be coupled to each other by a weld formed in a lower groove positioned between the bottom walls of the beams and below the abutting side walls at the seam. Additionally or alternatively, a weld may be formed in an upper grove positioned between the top walls of the beams and the abutting side walls at the seam. At least one weld may be formed in the upper groove through a seam weld slot in the plate in order to couple the adjacent beams to each other and to the plate with a single weld. Additionally or alternatively, the plate may be coupled to at least one beam by a weld formed in a truss weld slot. Welds may also be formed around the perimeter of the plate, including a weld coupling a first exterior side wall of a first beam to a first lateral edge of the plate and a second exterior side wall of a second beam to a second lateral edge of the plate. In some embodiments of the method 500, the step 540 for securing the plate to the beams may omit at least one of the described steps and/or include at least one additional step.

Some embodiments of a method 500 for forming a ramp apparatus may include a step 550 for securing an endpiece to a first or second end of the ramp apparatus. For example, step 550 may include positioning an end piece at one end of a ramp apparatus and coupling the end piece to at least one of the beams with a weld. In some embodiments, a weld may be formed around the perimeter of the end piece to couple it to at least one of a top wall, a bottom wall, an exterior or interior side wall, and an exposed brace wall of at least one of the beams. Additionally or alternatively, some embodiments may include a step for securing a cover plate to a first or second end of the ramp apparatus. For example, a cover plate may be positioned at an end of the ramp apparatus proximate an end piece and secured to the ramp apparatus with a weld. At least one weld may be formed around the perimeter of the cover plate to couple it to at least one of one of a top wall, a bottom wall, an exterior or interior side wall of the beam and/or the edge of the end piece. Further still, for embodiments of a cover plate that include weld slots, the step of attaching the cover plate may include forming a weld in at least one cover plate weld slot to couple two adjacent beams to each other and to the cover plate. In some embodiments of the method 500, the step 550 of securing an end piece and/or cover plate to the ramp apparatus may omit at least one of the described steps and/or include at least one additional step.

While the exemplary embodiment of the method 500 for fabricating a ramp apparatus is generally discussed in connection with a ramp apparatus having first and second beams, it should be appreciated that some embodiments of the method 500 may be used to fabricate a ramp apparatus with at least one additional beam. Some embodiments of a method 500 for fabricating a ramp apparatus may include at least one additional step. Additionally or alternatively, some embodiments of a method for fabricating a ramp apparatus may omit at least one of step 510, step 520, step 530, step 540, step 550, and any other step described herein.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

It is to be appreciated that that the ramp apparatus 200, the ramp apparatus 300, and the ramp apparatus 400 are but examples of the present disclosure and that features of these examples may be combined, removed, or interchanged between the examples while remaining within the scope of the present disclosure. Features depicted in conjunction with any one of the illustrated embodiments may be used in conjunction with the features of any other embodiment of the invention. In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ramp apparatus comprising:
   a first extruded beam extending between a first ramp end and a second ramp end, the first extruded beam including:
     a first top wall;
     a first bottom wall opposite the first top wall;
     a first side wall and a second side wall that each extend between the first top wall and the first bottom wall;
     a first brace wall that extends from the first side wall at a first interior corner of the first extruded beam, the first brace wall angling away from the first interior corner; and
     a second brace wall that extends from the second side wall at a second interior corner of the first extruded beam, the second brace wall angling away from the second interior corner;
   a second extruded beam including:
     a second top wall;
     a second bottom wall opposite the second top wall;
     a third side wall and a fourth side wall that each extend between the second top wall and the second bottom wall;
     a third brace wall that extends from the third side wall at a third interior corner of the second beam, the third brace wall angling away from the third interior corner; and
     a fourth brace wall that extends from the fourth side wall at a fourth interior corner of the second beam, the fourth brace wall angling away from the fourth interior corner;
   wherein the first beam and the second beam are arranged in a lengthwise manner with the second side wall of the first beam secured to the third side wall of the second beam.

2. The ramp apparatus of claim 1, further comprising a fifth brace wall that extends from the top wall to the bottom wall.

3. The ramp apparatus of claim 2, wherein the first brace wall, the second brace wall, and the third brace wall connect at a midpoint of either the first top wall or the first bottom wall.

4. The ramp apparatus of claim 1, wherein the first interior corner is a corner between the first side wall and the first bottom wall and the second interior corner is a corner between the second side wall and the first bottom wall, and the first and second brace walls meet at the midpoint of the top wall.

5. The ramp apparatus of claim 1, further comprising a curb wall that projects upward from the first top wall proximate a lateral side of the first extruded beam, the curb wall extending between the first ramp end and the second ramp end.

6. The ramp apparatus of claim 1, further comprising:
   a first end piece secured about the first ramp end and engaging the first side wall, the second side wall, and at least one of the first top wall and the first bottom wall; and
   a second end piece secured about the second ramp end and engaging the first side wall, the second side wall, and at least one of the top wall and the bottom wall.

7. The ramp apparatus of claim 6, wherein at least one of the first end piece and the second end piece is an end hook.

8. The ramp apparatus of claim 1, wherein the ramp apparatus has a length dimension between the first ramp end and the second ramp end and a width dimension perpendicular to the length dimension, and the first beam and the second beam provide the extent of the ramp apparatus in the width dimension.

9. The ramp apparatus of claim 1, wherein the second side wall of the first beam is secured to the third side wall of the second beam by a tongue and groove joint.

10. The ramp apparatus of claim 9, wherein a tongue projects outward from the second side wall, and a recess extends into the third side wall, and the recess is configured to receive the tongue to join the first beam and the second beam.

11. The ramp apparatus of claim 1, further comprising:
    a first chamfered corner between the first top wall and the second side wall;
    a second chamfered corner between the second top wall and the third side wall; and
    a first groove formed by the first chamfered corner and the second chamfered corner.

12. The ramp apparatus of claim 11, further comprising:
    a third chamfered corner between the first bottom wall and the second side wall;
    a fourth chamfered corner between the second bottom wall and the third side wall; and
    a second groove formed by the third chamfered corner and the fourth chamfered corner.

13. The ramp apparatus of claim 1, further comprising a plate secured to the first top wall and the second top wall.

14. The ramp apparatus of claim 13, wherein the plate extends from the first ramp end to the second ramp end, and the plate includes a plurality of traction openings formed through the plate.

15. The ramp apparatus of claim 13, wherein the plate includes a plurality of weld receiving openings in a row aligned with a seam between the second side wall and the third side wall.

16. The ramp apparatus of claim 13, further comprising:
    a handle that is rotatably secured to the first top wall or to the second top wall by a clamping portion of the plate;
    wherein the plate includes a first handle opening configured to receive a gripping portion of the handle on a first side of the clamping portion and a second handle opening configured to receive a gripping portion of the handle on a second side of the clamping portion.

17. A ramp apparatus comprising:
a first extruded beam extending between a first ramp end and a second ramp end, the first extruded beam including:
  a first top wall;
  a first bottom wall opposite the first top wall;
  a first side wall and a second side wall that each extend between the top wall and the bottom wall, the first side wall and the second side wall intersecting with the first top wall and first bottom wall at a first plurality of interior corners and a corresponding first plurality of chamfered exterior corners;
  a first vertical brace wall extending between the first top wall and the first bottom wall, the first vertical brace wall between the first side wall and the second side wall;
  a first brace wall that extends from a first interior corner of the first plurality of interior corners to the first vertical brace wall;
  a second brace wall that extends from a second interior corner of the first plurality of interior corners to the first vertical brace wall; and
a second extruded beam extending between the first ramp end and the second ramp end, the second extruded beam including:
  a second top wall;
  a second bottom wall opposite the second top wall;
  a third side wall and a fourth side wall that each extend between the second top wall and the second bottom wall, the third side wall and the fourth side wall intersecting with the second top wall and second bottom wall at a second plurality of interior corners and a corresponding second plurality of chamfered exterior corners;
  a second vertical brace wall extending between the second top wall and the second bottom wall, the first vertical brace wall between the third side wall and the fourth side wall;
  a third brace wall that extends from a third interior corner of the second plurality of interior corners to the second vertical brace wall; and
  a fourth brace wall that extends from a fourth interior corner of the second plurality of interior corners to the second vertical brace wall;
  a first set of fingers projecting outward from the second side wall
  a second set of fingers projecting outward from the third side wall;
  wherein the first extruded beam and the second extruded beam are arranged in a lengthwise manner with the first set of fingers in interleaved engagement with the second set of fingers to secure the second side wall to the third side wall.

18. The ramp apparatus of claim 17, wherein a first chamfered exterior corner of the first plurality of chamfered exterior corners and a second chamfered exterior corner of the second plurality of chamfered exterior corners form a first groove at a seam between the first extruded beam and the second extruded beam, the first groove extending from the first ramp and to the second ramp end between the first top wall and the second top wall; wherein the first groove is configured to receive at least one weld bead therein to secure the first extruded beam to the second extruded beam.

19. A method for fabricating a ramp apparatus, the method comprising steps for:
  aligning a first beam with a second beam in a lengthwise configuration such that the first beam and the second beam each extend between a first ramp end and a second ramp end;
  placing a plate on a first top wall of the first beam and a second top wall of the second beam such that a column of weld openings formed in the plate is aligned with a seam between the first beam and the second beam;
  welding a first bottom wall of the first beam to a second bottom wall of the second beam along a lower groove that extends from the first ramp end to the second ramp end at the seam between the first beam and the second beam; and
  welding, through the weld openings in the plate, a first top wall of the first beam to a second top wall of the second beam along an upper groove that extends from the first ramp end to the second ramp end at the seam between the first beam and the second beam.

* * * * *